(12) United States Patent
Murakami et al.

(10) Patent No.: US 6,376,961 B2
(45) Date of Patent: Apr. 23, 2002

(54) COIL ASSEMBLY OF ROTATING ELECTRICAL MACHINERY AND METHOD FOR PRODUCING THE SAME, AND STATOR OF ROTATING ELECTRIC MACHINERY USING THE SAME COIL ASSEMBLY

(75) Inventors: Tsutomu Murakami; Hironori Ozaki; Naohiro Oketani; Akira Morishita; Hiroshi Matsui; Tsuyoshi Takahashi; Katsumi Adachi; Takushi Takizawa; Yoshihito Asao; Atsushi Oohashi, all of Tokyo (JP)

(73) Assignee: Mitsubshi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/776,638

(22) Filed: Feb. 6, 2001

(30) Foreign Application Priority Data

| Feb. 7, 2000 | (JP) | ........................................ 2000-028644 |
| Sep. 27, 2000 | (JP) | ........................................ 2000-293217 |
| Dec. 28, 2000 | (JP) | ........................................ 2000-399698 |

(51) Int. Cl.$^7$ ................................................. H02K 1/00
(52) U.S. Cl. ........................ 310/184; 310/179; 310/201; 310/208
(58) Field of Search ................................ 310/184, 179, 310/198, 201, 206, 208, 254

(56) References Cited

U.S. PATENT DOCUMENTS 5,801,471 A * 9/1998 Hill ............................. 310/179
6,181,043 B1 * 1/2001 Kusase et al. ............... 310/201
6,201,332 B1 * 3/2001 Umeda et al. ............... 310/184
6,208,060 B1 * 3/2001 Kusase et al. ............... 310/254
6,252,326 B1 * 6/2001 Umeda et al. ............... 310/179

FOREIGN PATENT DOCUMENTS

JP          2927288          5/1999

* cited by examiner

Primary Examiner—Nestor Ramirez
Assistant Examiner—Thanh Lam
(74) Attorney, Agent, or Firm—Sughrue Mion, PLLC

(57) ABSTRACT

The invention provides a coil member of rotating electrical machinery, by which improvements in the mass production and downsizing thereof are enabled, which is a coil assembly for rotating electrical machinery, consisting of a plurality of coil combinations mounted at iron core slots, wherein the respective coil combinations 14 are inserted into slots at pitches equivalent to an appointed number of slots, and are formed of an integral coil member 21 in which the first and the second linear portions 21A and 21B alternately disposed at the inner layer side and the outer layer side in the slots, and the first and the second turning portions 21C and 21D for connecting the first and second linear portions 21A and 21B adjacent to each other outward of one end side and outward of the other end side in the lengthwise direction of the slots are integrated together. And, the first linear portion 21A of the appointed coil member 211 thereof, and the second linear portion 21B of another coil member 211 are laminated and disposed in the same slots.

20 Claims, 19 Drawing Sheets

(A)

(B)

(A)

(B)

COIL ASSEMBLY OF ROTATING ELECTRICAL MACHINERY AND METHOD FOR PRODUCING THE SAME, AND STATOR OF ROTATING ELECTRIC MACHINERY USING THE SAME COIL ASSEMBLY

BACKGROUND OF THE INVENTION

1. Field of the Invention

The present invention relates to a coil assembly of rotating electrical machinery such as a vehicle alternate current generator, etc., that is incorporated in a truck, etc., and a method for producing the same coil assembly, and a stator of rotating electric machinery using the same coil assembly, 2. Description of the Prior Art In order to make the vehicle alternate current generator more compact and more powerful for its size, it is mandatory to improve the space factor inside each slot of the core of the stator winding, and to arrange more neatly and increase the density of the cross-over parts on the outside of the slots of the stator winding, i.e., the coil end parts. Numerous improvements have been proposed as exemplified by Japanese Patent No. 2927288 concerning this point.

FIGS. 27 (A) and (B) are perspective views of the essential parts of the stator winding of an automobile alternator of the prior art viewed from the front and rear sides respectively, and FIG. 28 is a perspective view of the conductor segment used on the stator winding of the vehicle alternate current generator shown in FIG. 27.

These drawings show a conductor segment 1 comprising an inner layer conductor part 1a, an outer layer conductor part 1b and a turning portion 1c, which is formed into a U-shape by bending a copper band-like member. Multiple conductor segments 1 formed as such are arranged on the rear side of a stator iron core 2 neatly aligning the turning portions 1c. Next, the turning portion 1c is bent in such a way that the inner layer conductor part 1a and the outer layer conductor part 1b will be separated circumferentially by a specified number of slots as shown in FIG. 27 (B). Next, insert the outer layer conductor part 1b on the deeper side in the slot depth direction, and the inner layer conductor part 1a on the shallower side in the slot depth direction (not shown in the drawing), and join the end parts of the specified conductor segment 1 that are protruding on the front side by means of welding, brazing, and other similar methods as shown in FIG. 27 (A), thereby forming a conjunction part 3a to constitute a coil member 3.

The stator winding of the vehicle alternate current generator of the prior art were constituted by inserting a short U-shaped conductor segment 1 into the slots of the stator iron core 2 from the rear side and then joining the ends together that are protruding on the front side. Therefore, the work was inefficient and the productivity was low because it was necessary to insert numerous short conductor segments 1 into the slots of the stator iron core 2 and then join the ends one by one. Moreover, since the end portions have to be protruded further to allow the ends to be clamped by a fixture for the joining process, it was difficult to produce a smaller alternator.

SUMMARY OF THE INVENTION

The invention was developed to solve such problems and shortcomings as described above. It is therefore an object of the invention to provide a coil assembly for a rotating electrical machinery, for which mass production can be improved, and whose downsizing is enabled.

Also, it is another object of the invention to provide a method for producing a coil assembly for a rotating electrical machinery, by which improvements in the mass production and downsizing thereof are enabled.

In addition, it is yet another object of the invention to provide a stator for rotating electrical machinery, by which improvements in the mass production and downsizing thereof are enabled.

According to this invention, a coil assembly of rotating electrical machinery, which is mounted in a plurality of slots formed on the circumferential surface of an iron core at appointed pitches P, having a plurality of coil combinations, in which the respective coil combinations comprises a combination of a first coil member and a second coil member;

wherein each of said first coil member and second coil member includes:

a plurality of first linear portions disposed at pitches equal to "N" times ("N" is any natural number) said pitches P and respectively inserted in one of said plurality of slots;

a plurality of second linear portions disposed at pitches equal to "N" times said pitches P, positioned at the middle of said respective first linear portions and inserted into one of said plurality of slots;

a plurality of first turning portions for coupling said respective first linear portions with said respective second linear portions adjacent to one side of said respective first liner portions at one end side of said slots; and a plurality of second turning portions for coupling said respective first linear portions with said respective second linear portions adjacent to other side of said respective first liner portions at the other end side of said slots;

wherein said respective first linear portions, first turning portions, second linear portions and second turning portions are formed so as to be continued to each other by one strip member; and said first coil member and second coil member are combined so that in an appointed slot of said plurality of slots, the first linear portion of said first coil members is located at the inner layer side and the second linear portion of said second coil members is located at the outer layer side, and, in a slot separated by "N" slots from said appointed slot, the first linear portion of said second coil member is located at the inner layer side and the second linear portion of said first coil member is located at the outer layer side.

Therefore, the coil assembly of rotating electrical machinery, by which improvements in the mass production and downsizing thereof are enabled, can be provided.

Also, according to this invention, the coil assembly of rotating electrical machinery, wherein said first turning portions and said second turning portions, respectively, have an inclined portion extending said respective appointed slot to a turning point, and an inclined portion extending from said slot separated by "N" slots from said appointed slot to said turning point; and said turning point is displaced so as to be positioned nearer said slot separated by "N" slots from said appointed slot than said appointed slot.

Further, according to this invention, the coil assembly of rotating electrical machinery, wherein said first and second coil members are formed so that said respective first linear portions, first turning portions, second linear portions and second turning portions are continued by one strip member having an almost rectangular section.

Furthermore, according to this invention, the coil assembly of rotating electrical machinery, wherein said first and second coil members are formed so that said respective first linear portions, first turning portions, second linear portions and second turning portions are continued by one strip member having almost a circular section.

In addition, a coil assembly of rotating electrical machinery, according to this invention, which is mounted in a plurality of slots formed on the circumferential surface of an iron core at appointed pitches P, having a plurality of coil combinations, in which the respective coil combinations comprises a combination of a first coil member to a fourth coil member;

wherein each of said first coil member to said fourth coil member includes:

a plurality of first linear portions disposed at pitches equal to "N" times ("N" is any natural number) said pitches P and respectively inserted in one of said plurality of slots;

a plurality of second linear portions disposed at pitches equal to "N" times said pitches P, positioned at the middle of said respective first linear portions and inserted into one of said plurality of slots;

a plurality of first turning portions for coupling said respective first linear portions with said respective second linear portions adjacent to one side of said respective first liner portions at one end side of said slots; and a plurality of second turning portions for coupling said respective first linear portions with said respective second linear portions adjacent to other side of said respective first liner portions at the other end side of said slots;

wherein said respective first portions, first turning portions, second linear portions and second turning portions are formed so as to be continued to each other by one strip member;

said first coil member and second coil member are combined so that in an appointed slot of said plurality of slots, the first linear portion of said first coil members is located in the first layer and the second linear portion of said second coil members is located in the fourth layer, and, in a slot separated by "N" slots from said appointed slot, the first linear portion of said second coil member is located in the first layer and the second linear portion of said first coil member is located in the fourth layer; and said third coil member and fourth coil member are combined so that in the appointed slot of said plurality of slots, the first linear portion of said third coil members is located in the second layer and the second linear portion of said fourth coil members is located in the third layer, and, in the slot separated by "N" slots from said appointed slot, the first linear portion of said fourth coil member is located in the second layer and the second linear portion of said third coil member is located in the third layer.

Therefore, the coil assembly of rotating electrical machinery, by which improvements in the mass production and downsizing thereof are enabled, can be provided.

Also, a method for producing a coil assembly of rotating electrical machinery, according to this invention, comprising the steps of:

winding step for winding a plurality of strip members coaxial with each other so that said plurality of strip coil members, respectively, are provided with: a plurality of the first linear portions located on the first plane; a plurality of the second linear portions located at the second plane parallel to said first plane; a plurality of the first turning portions for coupling said respective first linear portions with said respective second linear portions adjacent to one side of said respective first liner portions; and a plurality of the second turning portions for coupling said respective first linear portions with said second linear portions adjacent to the other side of said respective first liner portions and displacing step for displacing said respective first linear portions on said first plane and said second linear portions on the second plane so that these linear portions move in parallel to each other, by displacing the first end portions of said respective first linear portions of said plurality of coil members on said first plane, and the first end portions of said respective second linear portions thereof on said second plane in the direction opposed to each other, and concurrently displacing the second end portions of said respective linear portions of said respective coil members on said second plane and the second end portions of said respective first linear portions thereof on said first plane in the direction opposed to each other;

wherein in said displacing step, a plurality of coil combinations in which two coil members of said plurality of coil members are combined are formed, said respective coil combinations have said respective second linear portions of the second coil members positioned on said respective first linear portions of the first coil members, and have said respective first linear portions of said second coil members positioned below said respective second linear portions of said first coil members.

Therefore, it is possible to provide a method for producing a coil assembly for rotating electrical machinery, by which improvements in the mass production and downsizing thereof are enabled.

Further, according to this invention, the method for producing a coil assembly of rotating electrical machinery, wherein said plurality of coil combinations are, respectively, combined and inserted so that, in an appointed slot of a plurality of slots formed on an iron core at appointed pitches P, the first linear portions of said first coil members are located on the first layer, and the second linear portions of said second coil members are located on the second layer, and in slots separated by "N" slots from the appointed slot, the first linear portions of said second coil members are located on the first layer and the second linear portions of said first coil members are located on the second layer.

Further, according to this invention, the method for producing a coil assembly of rotating electrical machinery, further comprising the step of pressing the respective coil members so that the respective first linear portions on said first plane are caused to approach the respective second linear portions on said second plane.

Therefore, it is possible to provide a method for producing a coil assembly for rotating electrical machinery, by which further downsizing thereof are enabled.

Further, according to this invention, the method for producing a coil assembly of rotating electrical machinery, wherein said pressing step is carried out before said displacing step.

Furthermore, according to this invention, the method for producing a coil assembly of rotating electrical machinery, wherein said pressing step is carried out after said displacing step.

Therefore, it is possible to provide a method for producing a coil assembly for rotating electrical machinery, by which the insulation thereof can be improved.

Furthermore, according to this invention, the method for producing a coil assembly of rotating electrical machinery, wherein, before inserting said respective coil combinations into the slots after said displacing step, lead-out conductors are formed at necessary coil members and necessary connections are carried out.

Therefore, it is possible to provide a method for producing a coil assembly for rotating electrical machinery, by which efficiency in the wiring work can be improved.

Furthermore, according to this invention, the method for producing a coil assembly of rotating electrical machinery, in which said respective first turning portions and said respective second turning portions have an inclined portion extending from said respective appointed slots to a turning point, and an inclined portion extending from a slot separated by "N" slots from said appointed slots to said turning point, further comprising the step of displacing said turning point so that said turning point is located nearer the slot separated by "N" slots from said appointed slots than said appointed slots.

Therefore, it is possible to provide a method for producing a coil assembly for rotating electrical machinery, by which further downsizing thereof are enabled.

Furthermore, according to this invention, the method for producing a coil assembly of rotating electrical machinery, wherein, when said displacing step is terminated, both-end portions of said plurality of coil members are collected and disposed at the same side as that of any one of said plurality of the first turning portions and said plurality of the second turning portions.

Therefore, it is possible to provide a method for producing a coil assembly for rotating electrical machinery, by which efficiency in connection work can be improved.

Furthermore, according to this invention, the method for producing a coil assembly of rotating electrical machinery, wherein, when said displacing step is terminated, both-end portions of said plurality of coil members are distributed to the same side as that of said plurality of the first turning portions and the same side as that of said plurality of the second turning portions and disposed thereat.

Therefore, it is possible to provide a method for producing a coil assembly for rotating electrical machinery, by which efficiency in the connection work can be further improved.

Furthermore, according to this invention, the method for producing a coil assembly of rotating electrical machinery, wherein in said displacing step, the first end portions of the respective first linear portions of said plurality of coil members, the first end portions of said respective second linear portions thereof, the second end portions of the respective second linear portions of the respective coil members, and the second end portions of the respective first linear portions thereof are, respectively, displaced by separate movable members.

Therefore, it is possible to provide a method for producing a coil assembly for rotating electrical machinery, by which improvements in the mass production and downsizing thereof are enabled.

Furthermore, according to this invention, the method for producing a coil assembly of rotating electrical machinery, wherein said movable member having a plurality of pins are used as said respective movable members.

Furthermore, according to this invention, the method for producing a coil assembly of rotating electrical machinery, wherein said movable member having a plurality of blades is used as said respective movable members, and the respective blades are brought into facial contact with the linear portions of the respective coil members.

Therefore, it is possible to provide a method for producing a coil assembly for rotating electrical machinery, by which improvements in the mass production and downsizing thereof are enabled as a matter of course, and insulation property can be further improvement.

In addition, according to this invention, a method for producing a coil assembly of rotating electrical machinery, comprising the steps of:

bending step for forming a plurality of linear portions and a plurality of inclined portions in the form such that they are inclined at an appointed angle with respect to respective adjacent linear portions between said adjacent linear portions and said inclined portion is placed therebetween, by bending a plurality of strip coil members almost parallel to each other on a certain plane a plurality of times; and folding and overlapping step for folding and overlapping the respective coil members of said respective inclined portions one after another at the position where said coil members are equally divided into one half section and the other half section in its lengthwise direction so that said other half section crosses and overlaps said one half section at said appointed angle;

wherein, in said folding and overlapping step, a plurality of coil combinations in which two coil members of said plurality of coil members are combined are formed, said respective coil combinations have said respective second linear portions of said second coil members positioned on respective first linear portions of said first coil members, and have respective first linear portions of said second coil members positioned below respective second linear portions of said first coil members.

Therefore, it is possible to provide a method for producing a coil assembly for rotating electrical machinery, by which improvements in the mass production and downsizing thereof are enabled.

Furthermore, according to this invention, the method for producing a coil assembly of rotating electrical machinery, wherein said plurality of coil combinations are, respectively, combined and inserted so that, in an appointed slot of a plurality of slots formed on an iron core at appointed pitches P, the first linear portions of said first coil members are located on the first layer, and the second linear portions of said second coil members are located on the second layer, and in slots separated by "N" slots from the appointed slot, the first linear portions of said second coil members are located on the first layer and the second linear portions of said first coil members are located on the second layer.

In addition, according to this invention, a stator of rotating electric machinery, comprising:

a stator iron core having a plurality of slots formed along the circumferential surface at appointed pitches P and a coil assembly mounted the slots of said stator iron core, and having a plurality of coil combinations, in which the respective coil combinations comprises a coil combinations of a first coil members and a second coil members, wherein each of said first coil members and said second coil members including:

a plurality of first linear portions disposed at pitches equal to "N" times ("N" is any natural number) said pitches P and respectively inserted in one of said plurality of slots;

a plurality of second linear portions disposed at pitches equal to "N" times said pitches P, positioned at the middle of said respective first linear portions and inserted into one of said plurality of slots;

a plurality of first turning portions for coupling said respective first linear portions with said respective second linear portions adjacent to one side of said respective first liner portions thereto at one end side of said slots; and a plurality of second turning portions for coupling said respective first linear portions with said respective second linear portions adjacent to the other side of said respective first liner portions at the other end side of said slots;

wherein said respective first linear portions, first turning portions, second linear portions and second turning portions are formed so as to be continued to each other by one strip member; and said first coil member and second coil member are combined so that in an appointed slot of said plurality of slots, the first linear portion of said first coil members is located at the inner layer side and the second linear portion of said second coil members is located at the outer layer side, and, in a slot separated by "N" slots from said appointed slot, the first linear portion of said second coil member is located at the inner layer side and the second linear portion of said first coil member is located at the outer layer side.

Therefore, it is possible to provide a stator of rotating electrical machinery, by which improvements in the mass production and downsizing thereof are enabled.

In according to this invention, a coil assembly of rotating electrical machinery and a method for producing the same, and a stator of rotating electric machinery using the same coil assembly, respectively, can bring about the following features, advantages and effects.

EMBODIMENTS OF THE INVENTION

Hereinafter, a description is given of embodiments of the invention on the basis of the accompanying drawings:

Embodiment 1

Figure 1:
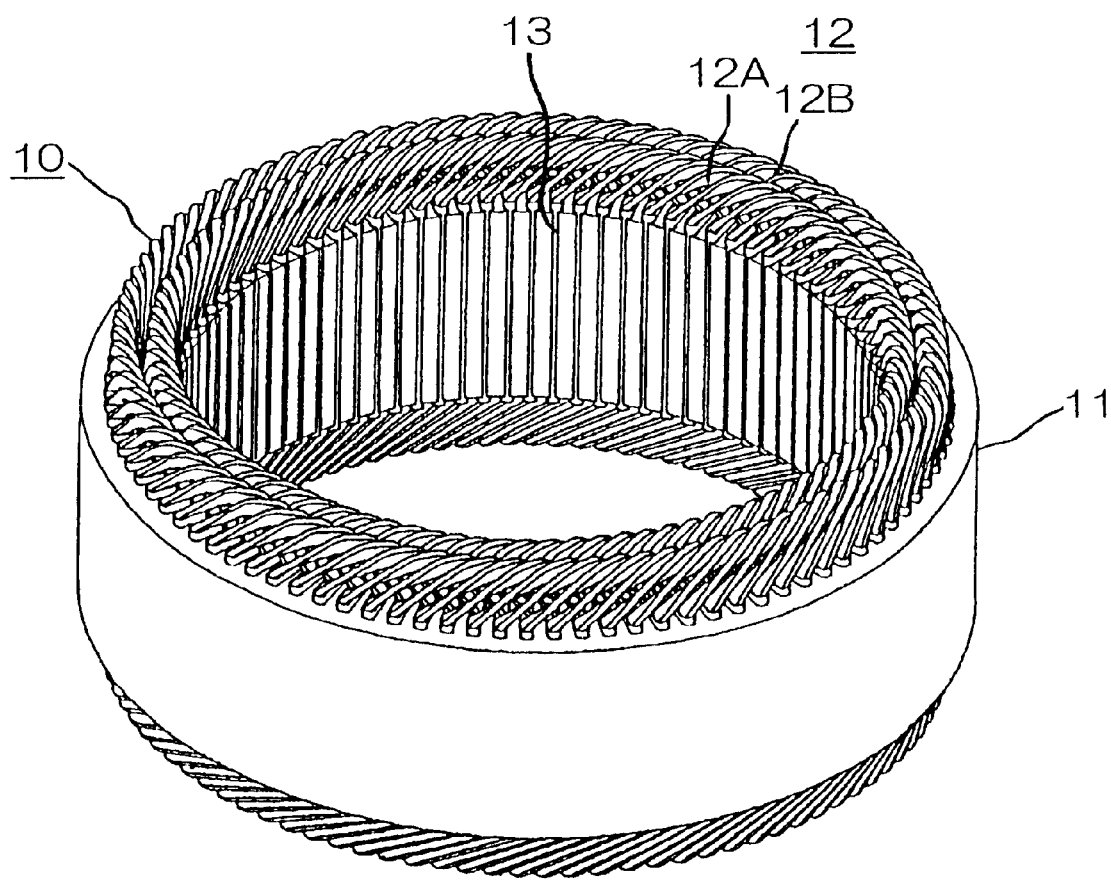
FIG. 1 is a perspective view showing the appearance of a stator of an alternate current generator for vehicles, to which a coil assembly according to the first embodiment of the invention is applied.
Figure 2:
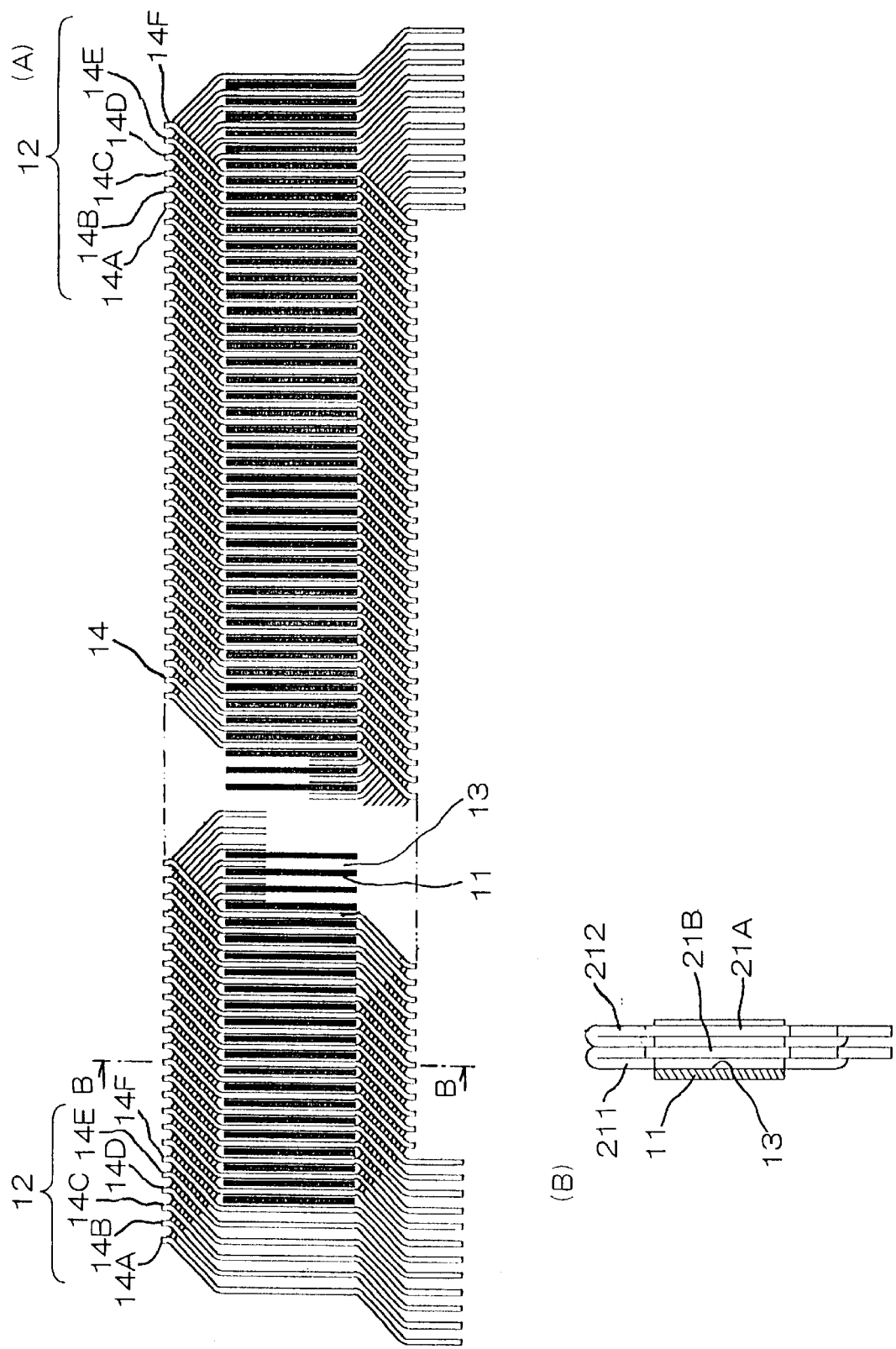
FIG. 2 develops the construction of the coil assembly in FIG. 1 together with a stator, wherein (A) is a developed front elevational view, and (B) is a side elevational view taken along the line B—B in (A)
Figure 3:
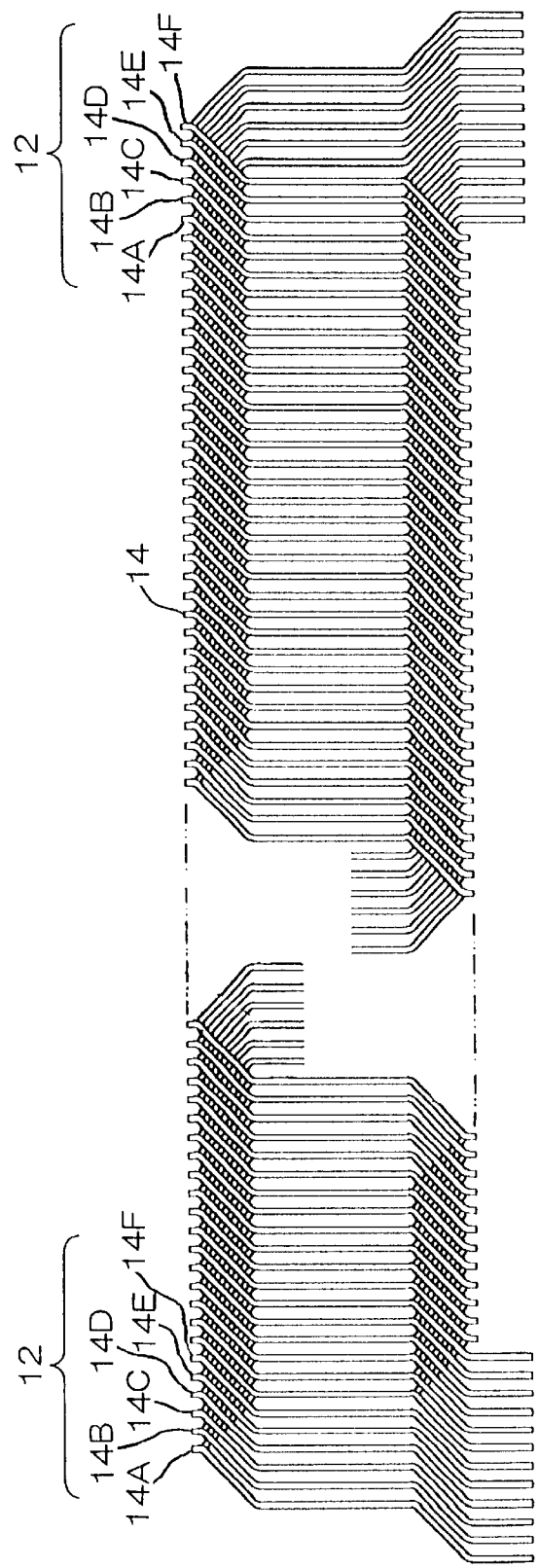
FIG. 3 is a developed front elevational view showing a part of the construction of the coil assembly in FIG. 1.
Figure 4:
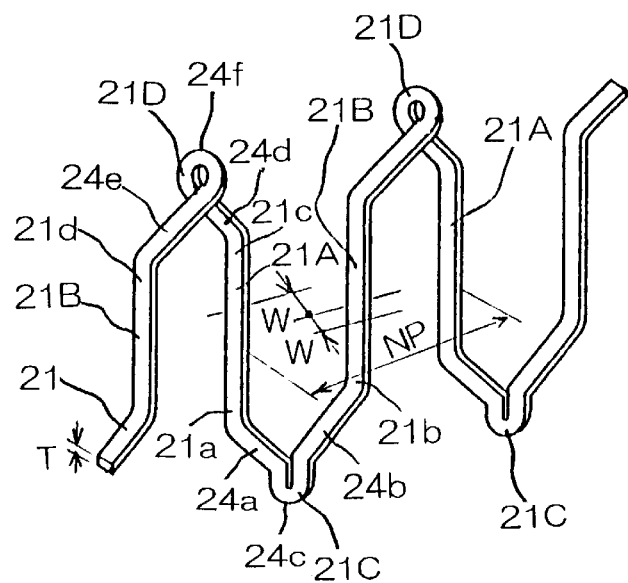
FIG. 4 is a perspective view showing a part of the construction of one coil member in FIG. 3.
Figure 5:
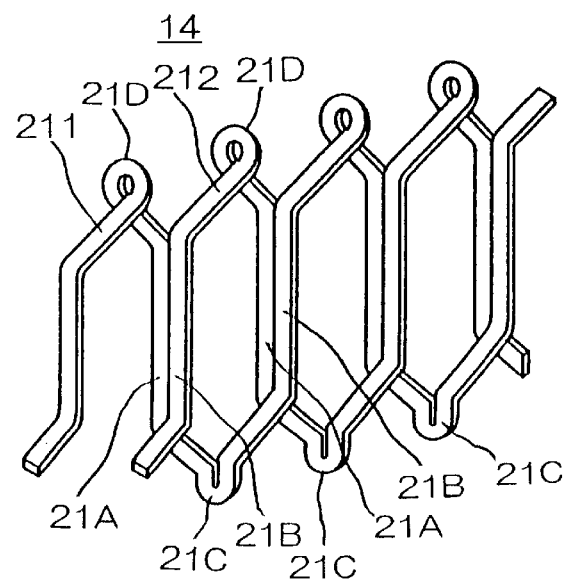
FIG. 5 is a perspective view showing a part of the construction of one coil combination in FIG. 3.

FIG. 1 is a perspective view showing the appearance of a stator of an alternate current generator for a vehicle, to which a coil assembly according to a first embodiment of the invention is applied. FIG. 2 shows the construction of the coil assembly in FIG. 1, which is developed together with the stator, wherein (A) is a developed front elevational view, and (B) is a side elevational view observed along the line B—B in (A). FIG. 3 is a developed front elevational view showing the developed construction of the coil assembly in FIG. 1. FIG. 4 is a perspective view showing a part of the construction of one coil assembly in FIG. 3. FIG. 5 is a perspective view showing a part of the construction of one coil combination in FIG. 3.

Figure 6:
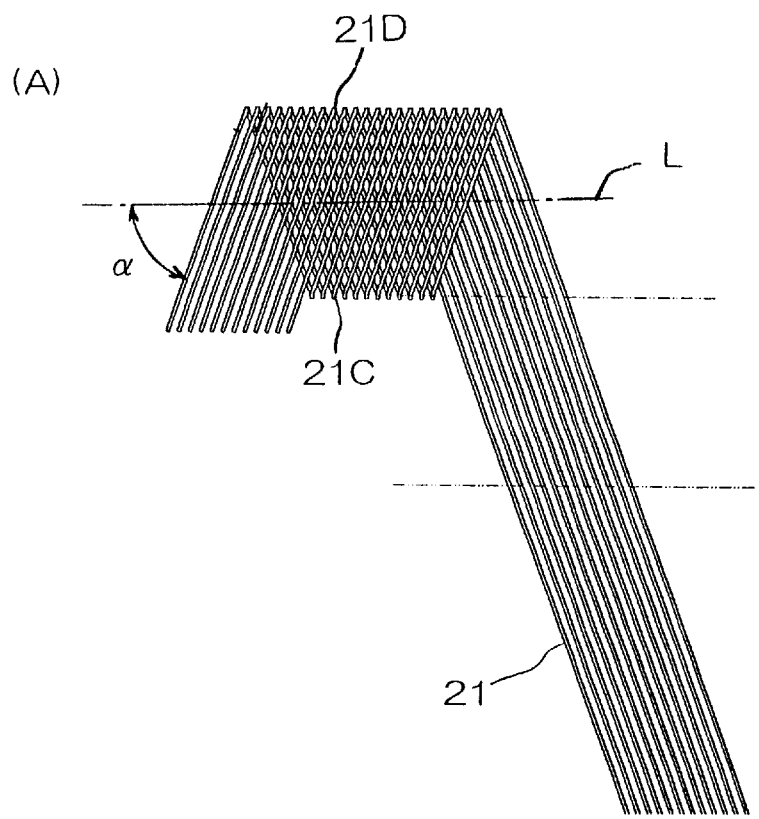
FIG. 6 shows a production process of a coil assembly in FIG. 3, wherein (A) is a view showing a winding step, and (B) is a view showing a displacing step.
Figure 6:
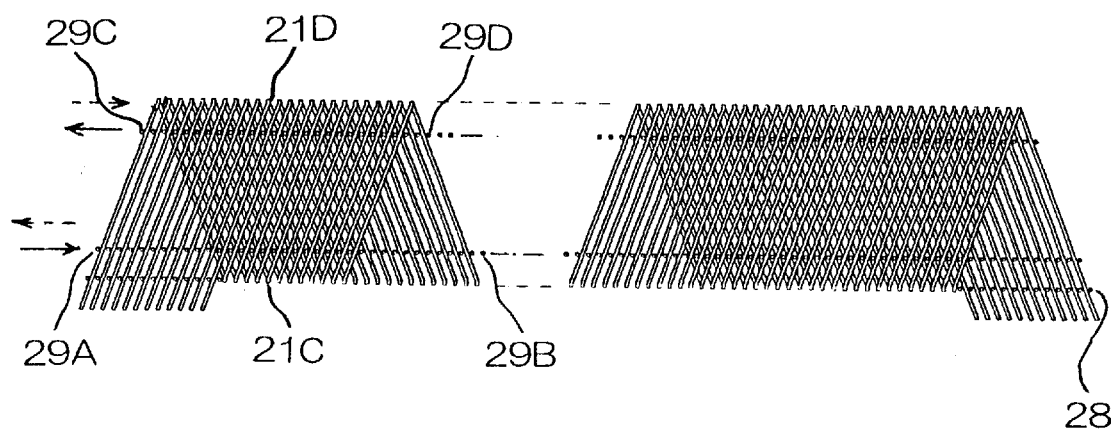
Figure 7:
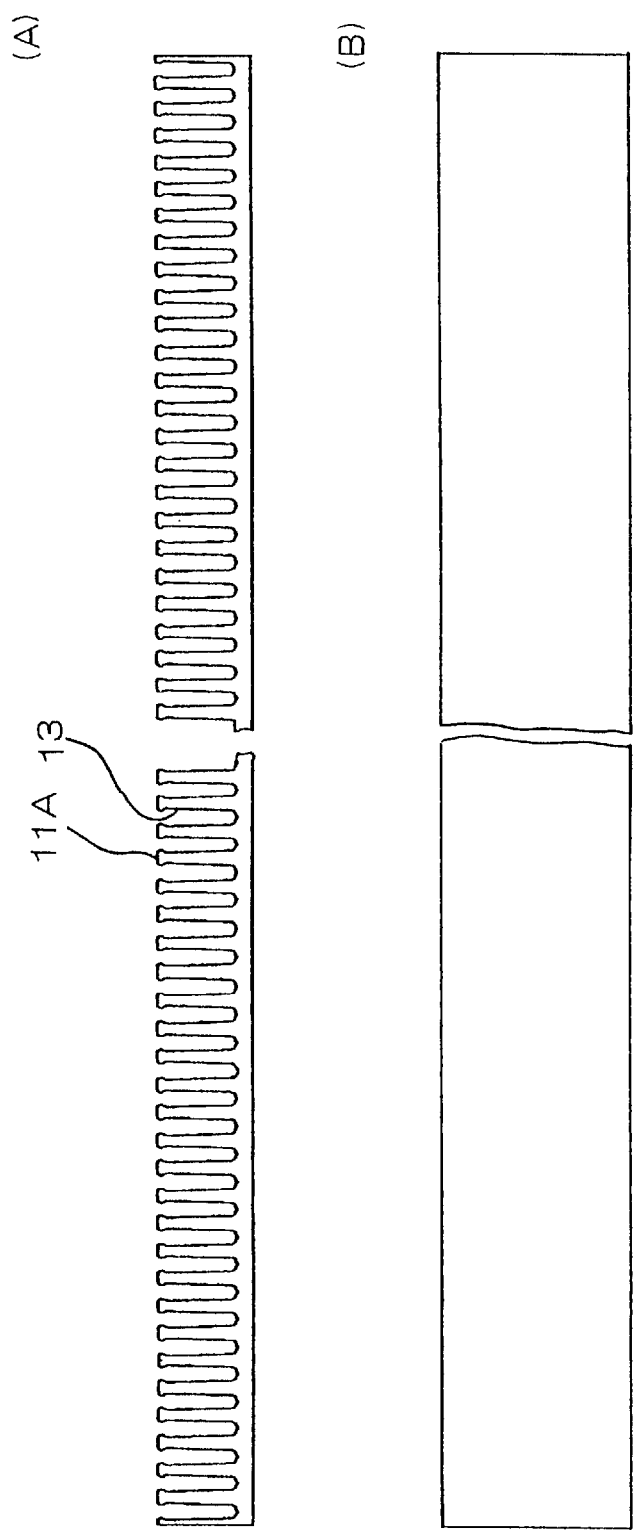
FIG. 7 shows the construction of plate-like stator iron core, wherein (A) is a plan view, and (B) is a side elevational view.
Figure 8:
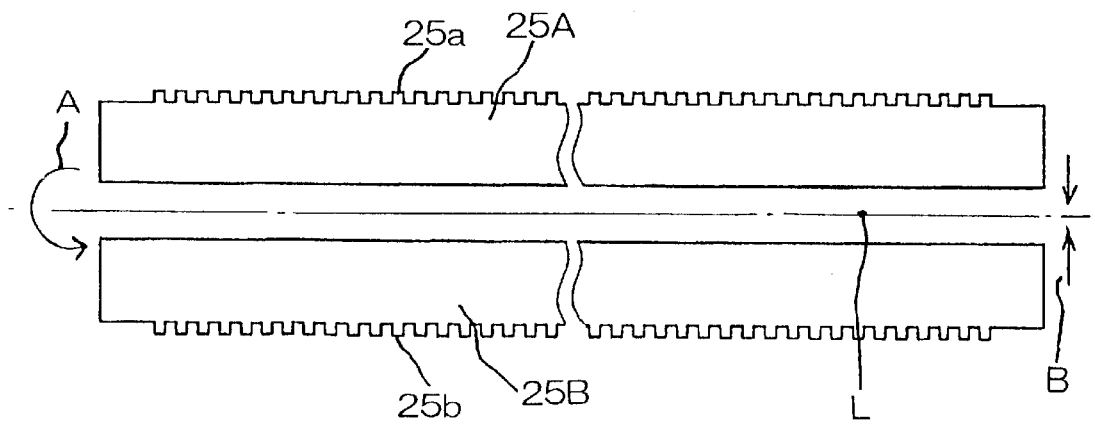
FIG. 8 is a plan view showing the construction of a plate-like winding core on which a coil is wound.
Figure 9:
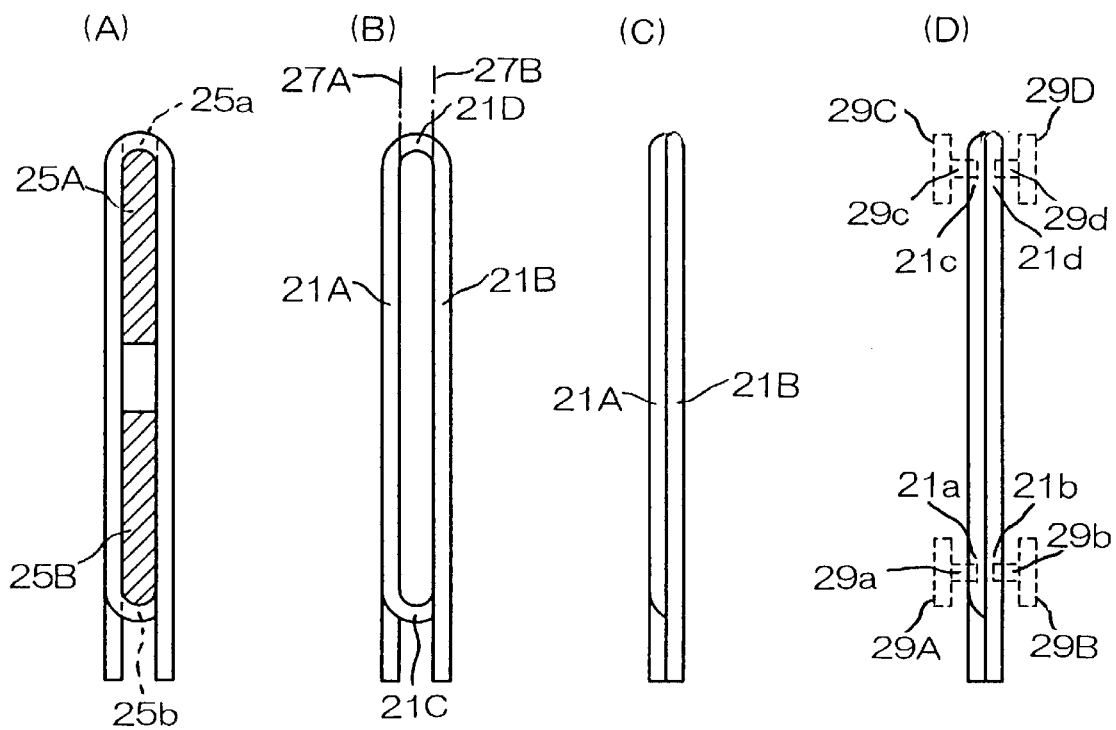
FIGS. 9(A)(B)(C)(D) is a side elevational view showing a pressing step and a displacing step after a coil member is spirally wound.
Figure 10:
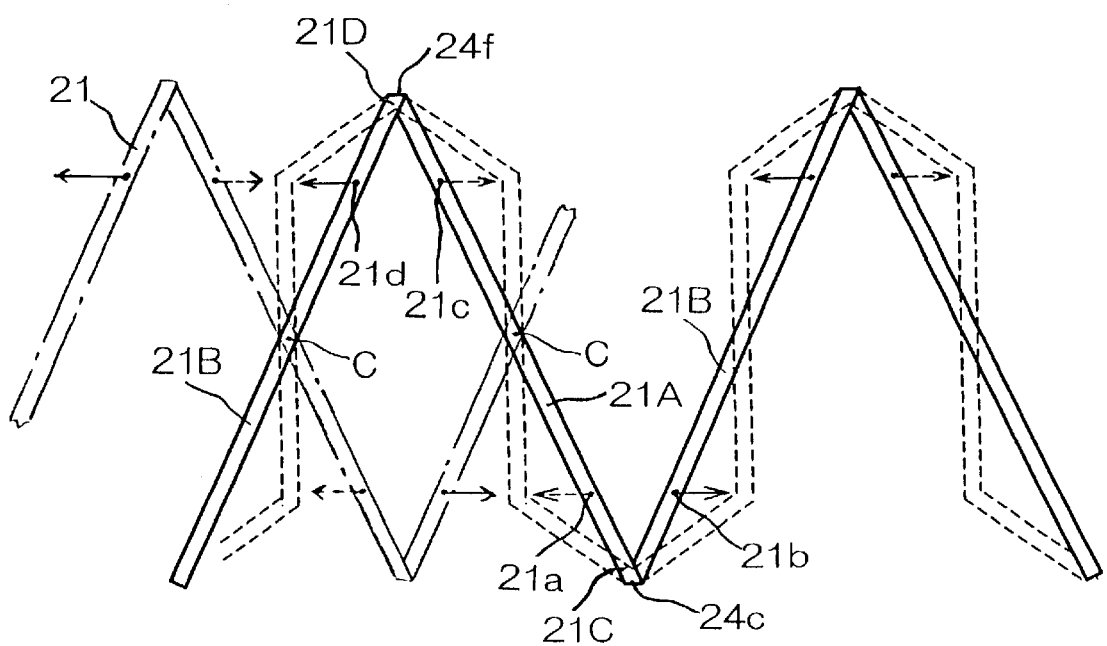
FIG. 10 is an exemplary view explaining the displacing step in FIG. 6 in detail.
Figure 11:
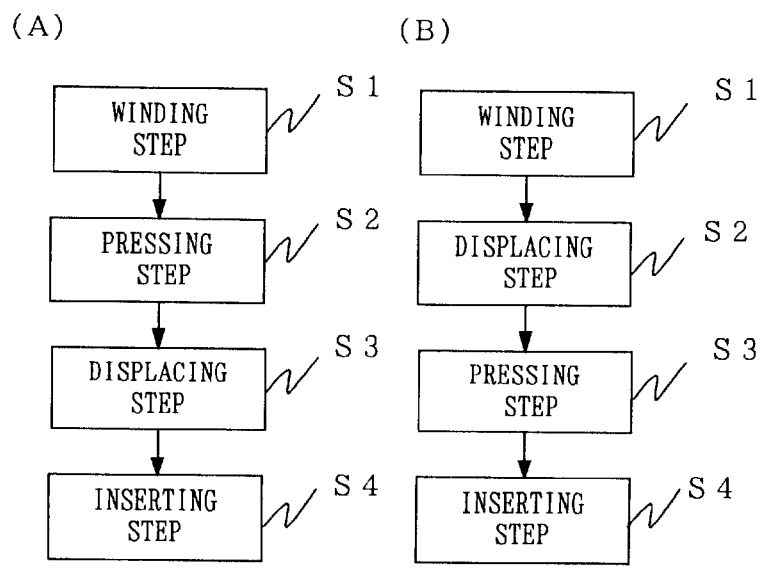
FIGS. 11(A)(B) is a block diagram showing two different types of a coil assemblies by comparison.
Figure 12:
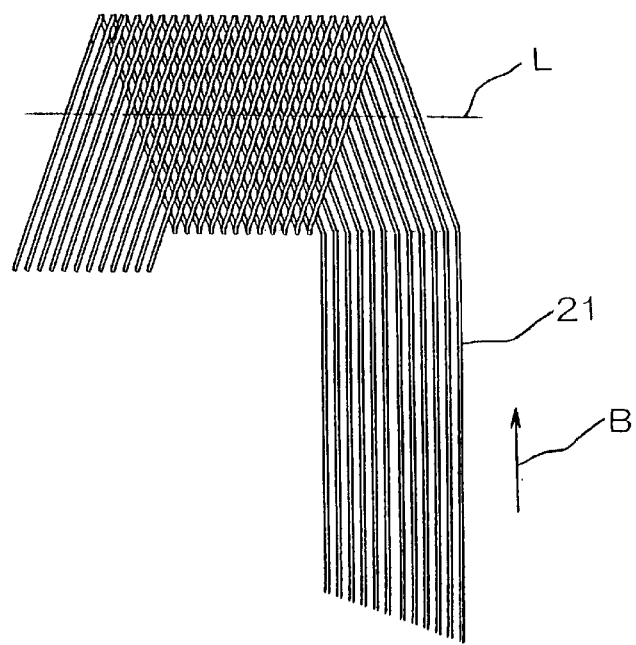
FIG. 12 is a view showing a winding step which differs from the coil in FIG. 6.
Figure 13:
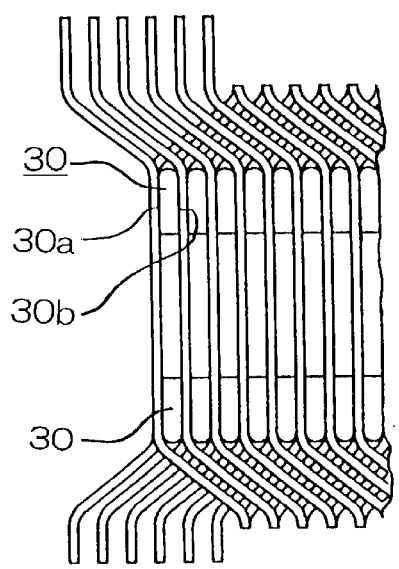
FIG. 13 is a view showing a displacing step which differs from the coil in FIG. 6.
Figure 14:
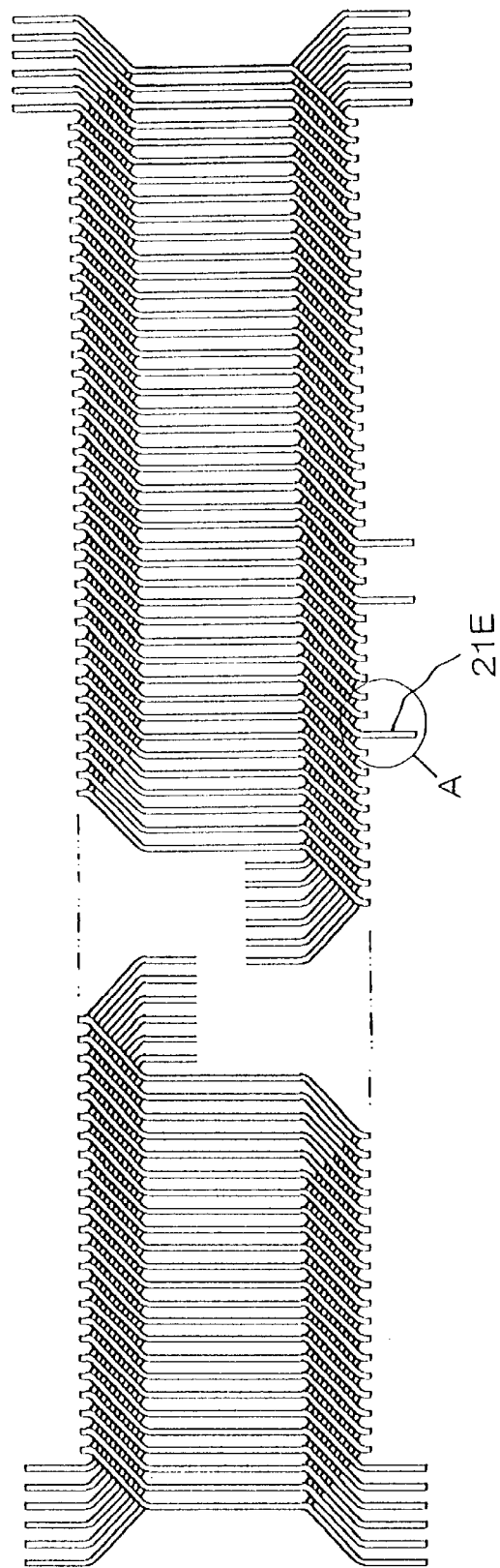
FIG. 14 is a developed view showing the construction of a coil assembly differing from that in FIG. 3.
Figure 15:
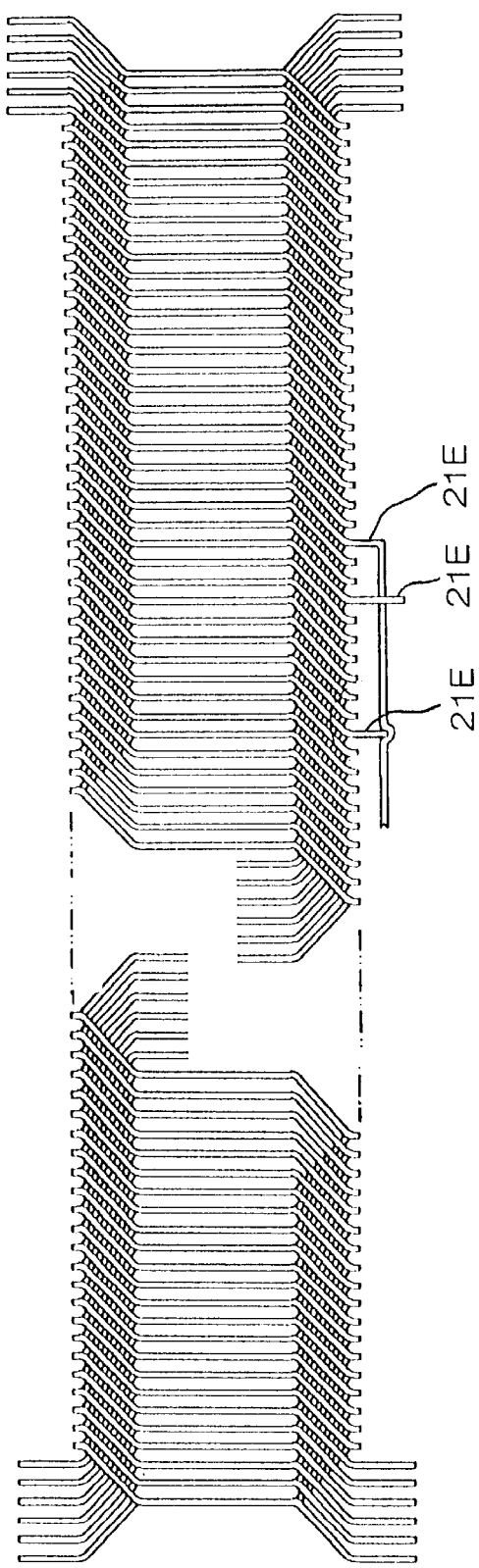
FIG. 15 is a developed view showing the construction of a coil assembly further differing from that in FIG. 3.

FIG. 6 shows the production process of the coil member in FIG. 3, wherein (A) shows a winding step, and (B) shows a displacing step. FIG. 7 shows the construction of a flat-type stator iron core, wherein (A) is a plan view, and (B) is a side elevational view. FIG. 8 is a plan view showing the construction of a plate-shaped winding core for winding a coil. FIG. 9 is a side elevational view showing a pressing step and a displacing step after a coil member is spirally wound. FIG. 10 is an exemplary view explaining the detail of the displacing step in FIG. 6. FIG. 11 is a block diagram showing two types of different steps of a coil assembly by comparison. FIG. 12 is a view showing a winding step differing from FIG. 6 that shows a coil member. FIG. 13 is a view showing a displacing step differing from FIG. 6 that shows a coil member. FIG. 14 is a developed view showing the construction of a coil assembly differing that in FIG. 3. FIG. 15 is a developed view showing the construction of a coil assembly further differing from that in FIG. 3.

In the drawings, a flat type stator iron core 11A has a plurality of slots 13 formed on one side thereof. A coil member 21 is provided with an insulation film and, as shown in FIG. 4, is formed of an integral strip or band-shaped member having a rectangular section, which has a width W and a thickness T. And, the coil member 21 is formed of the first linear portion 21A and the second linear portion 21B alternately disposed at the inner layer side (the inner circumferential side of the stator iron core 11) and the outer layer side (the outer circumferential side of the stator iron core 11) in slots 13 while shifting them by the width W in the lamination direction at pitches P equivalent to appointed slots, and the first turning portion 21C and the second turning portion 21D that connect these linear portions 21A and 21B outward of one end side and outward of the other end side of the slots 13 in the lengthwise direction. As shown in FIG. 5, a coil combination 14 is constructed by laminating and disposing the first linear portion 21A of one coil member 22 formed as described above and the second linear portion 21B of the other coil member 23 in the same slot 13. A stator iron core 11 is formed by bending a parallelepiped iron core 11A, in which a coil assembly 12 having a plurality of coil combinations 14 combined is incorporated, so that the respective slots 13 comes inside, making it annular, and fixing and integrating the end portions thereof together. A stator 10 is constructed of a coil assembly 12 and a stator iron core 11.

[Coil assembly]

First, a detailed description is given of a coil assembly according to the first embodiment with reference to FIG. 1 through FIG. 5.

In FIG. 1, the stator 10 has a stator iron core 11 and a coil assembly 12 incorporated therein. The stator iron core 11 is formed to be annular and has a plurality slots 13 formed along the inner circumferential surface at appointed pitches P. The coil assembly 12 has an inner layer assembly 12A and an outer layer assembly 12B coaxial incorporated in the stator iron core 11. The inner layer assembly 12A and outer layer assembly 12B of the coil assembly 12 is incorporated in the stator iron core 11 in a form such that they are inserted in a plurality of slots 13. However, for the convenience of explanation, FIG. 2 focuses on one coil assembly 12 and shows the relationship between the coil assembly 12 and the stator iron core 11. FIG. 3 shows only one coil assembly 12.

The inner layer assembly 12A of the coil assembly 12 includes a plurality of coil combinations 14. In the first embodiment, for example, six coil combinations 14A through 14F are used. The respective coil combinations 14A through 14F are bent and folded to be continuous from the left side to the right side in FIG. 2 and FIG. 3. As shown in FIG. 5, the respective coil combinations 14 are constructed of a combination of coil members 21, in detail, two coil members 211 and 212. The respective coil members 21 are formed by bending one strip or band-shaped member. The strip member is a long member of a conductive material such as a copper material, whose section is, for example, rectangular. And it has a width W and a thickness T. A conductive material whose section is circular may be used.

FIG. 4 shows a coil member 21. The coil members 211 and 212 are constructed as in the coil member 21. The coil member 21 has a plurality of the first linear portions 21A, a plurality of the second linear portions 21B, a plurality of the first turning portions 21C, and a plurality of the second turning portions 21D. And, the coil member 21 is constructed by bending a strip or band-shaped member so that they are continued from each other. A plurality of the first linear portions 21A are disposed in parallel to each other at a pitch NP which is equivalent to "N" times (n: a natural number) the pitch P of the slots 13 of the stator iron core 11. A plurality of the second linear portions 21B are disposed in parallel to each other at the same pitch NP. A plurality of the second linear portions 21B are, respectively, in parallel to the respective first linear portions 21A and are positioned just in the middle of the respective first linear portions 21A adjacent to each other.

The respective first linear portions 21A and the respective second linear portions 21B are disposed at two circumferences differing from each other, centering around the axial center of the stator iron core 11. The respective first linear portions 21A are positioned at the inner circumference of the two circumferences, and are located at the inner layer side of the slots 13. Also, the respective second linear portions 21B are positioned at the outer circumference thereof and are located at the outer layer side. These two circumferences are positioned so as to shift just by the width W of the coil member 21 in the radial direction. As a result, the first linear portions 21A and the second linear portions 21B are disposed so as to shift by the width W in the radial direction.

A plurality of the first turning portions 21C are disposed at one end side of the respective first linear portions 21A and the respective second linear portions 21B, that is, one end side of the stator iron core 11. The first turning portions 21C are, respectively, positioned between the first linear portions 21A and the second linear portions 21B adjacent thereto at one side of the first linear portions 21A, thereby coupling their end portions 21a and 21b with each other at the same side. The first turning portions 21C have inclined portions 24a and 24b respectively linked with the end portions 21a and 21b and a turning point 24c where the these inclined portions 24a and 24b are coupled with each other.

A plurality of the second turning portions 21D are disposed at the other end side of the respective first linear portions 21A and the respective second linear portions 21B, that is, at the other end side of the stator iron core 11. The respective second turning portions 21D are positioned between the first linear portions 21A and the second linear portions 21B adjacent thereto at other side of the first liner portions 21A, and couple their end portions 21c and 21d to each other at the same side thereof. The second turning portions 21D have inclined portions 24d and 24e, respectively, continued to the end portions 21c and 21d, and a turning point 24f coupled with these inclined portions 24d and 24e.

FIG. 5 shows the construction of a coil combination 14. The respective coil combinations 14A through 14F are constructed as in FIG. 5. The respective coil combinations 14 are constructed of a combination of two coil members 211 and 212. These two coil members 211 and 212 are combined such that the respective second linear portions 21B of the coil member 212 position or overlap the outside of the respective first linear portions 21A of the coil member 211 located on the inner circumference, and the first linear portions 21A of the coil member 212 overlap the inside of the respective second linear portions 21B of the coil member 211 located on the outer circumference.

The coil combinations 14 are assembled to the stator iron core 11 in such a manner that the first linear portion 21A of the coil member 211 and the second linear portion 21B of the coil member 212, which overlap each other, are inserted into an appointed slot 13 of the stator iron core 11, and the first linear portion 21A of the coil member 212 and the second linear portion 21B of the coil member 211, which overlap each other, are inserted into a slot 13 separated by "N" slots from the appointed slot 13. In the appointed slot 13, the first linear portion 21A of the coil member 211 is located at the inner layer side, and the second linear portion 21B of the coil member 212 is located at the outer layer side. In addition, in the slot separated from "N" slots from the appointed slot 13, the second linear portion 21B of the coil member 212 is located at the inner layer side, and the first linear portion 21A of the coil member 211 is located at the outer layer side.

The respective turning points 24c of the respective first turning portions 21C and the respective turning points 24f of the respective second turning points 21D are located at a position that is extremely protruded from the stator iron core 11 at both ends of the stator iron core 11. But, these turning points 24c and 24f are the points of conversion of the orientation of the strip member. As in the prior arts, the coil segments are not joined to each other at these portions. The turning points being the points of conversion of the orientation of the strip members do not require any large space for joining, wherein there is an effect in which the length of protrusion from the stator iron core 11 can be reduced. Based thereon, the downsizing of the coil assembly 12 and stator 10 can be achieved.

If the respective turning points 24c are constructed so as to be shifted down in the same direction in the circumferential direction, and concurrently, the respective turning points 24f are shifted down in the same direction in the circumferential direction, the length of protrusion of the turning points 24c and 24f can be further reduced, wherein the downsizing of the coil assemblies 12 and the stator 10 can be further fostered. In this case, the respective turning points 24c are shifted down to the position nearer to either linear portion of the first or second linear portions from the interim point between the first linear portions 21A of the respective coil members 21 and the second linear portions 21B adjacent thereto at one side thereof. Similarly, the respective turning points 24f are shifted down to either linear portion of the first or the second linear portions from the interim point between the first linear portions 21A of the respective coil members 21 and the second linear portions 21B adjacent thereto at the other side thereof.

[Method for producing a coil assembly]

Next, a description is given of a method for producing a coil assembly constructed as described above, with reference to the accompanying drawings FIG. 6 through FIG. 15.

<Preparation step of a stator iron core>

First, a stator iron core 11 is prepared as a flat stator core 11A as shown in FIG. 7. One side of the stator core 11A is provided with a plurality of slots 13 formed at pitches P.

<Winding step of a coil assembly>

In this step, a plurality of coil combinations 14 that constitute a coil assembly 12 are wound at the same time. In this winding step, a pair of plate-like winding cores 25A and 25B opposed to each other are prepared in order to simultaneously wind a plurality of strip coil members 21, twelve coil members in this embodiment, as shown in FIG. 8. The plate-like winding cores 25A and 25B are provided with a plurality of projections 25a and 25b to restrict respective strip coil members 21 on the outer surface thereof. The respective strip coil members 21 are inserted between the projections 25a of the plate-like winding core 25A in a state where the coil members 21 are inclined at an appointed angle α with respect to the extending direction of the winding cores 25A and 25B, and are restricted and retained between the projections 25a so that they do not move.

Next, as shown by the arrow A in FIG. 8, by turning both plate-like winding cores 25A and 25B altogether centering around the center axis thereof, the respective strip coil members 21 are wound on the circumference of both plate-like winding cores 25A and 25B as shown in FIG. 9. Hereinafter, by repeating turning of both plate-like winding cores 25A and 25B one after another, respective strip coil members 21 are bent or folded over at the position shown by the two-dashed line in FIG. 6(A) and are wound on the circumference of both plate-like winding cores 25A and 25B by the appointed number of times of winding.

Next, both plate-like winding cores 25A and 25B are moved so as to approach each other as shown by the arrow B in FIG. 8 to cause the restriction of the respective projections 25a and 25b and the respective coil members 21 to be released, wherein the coil members 21 are removed by moving them along the center of the winding core. At this time, as shown in FIG. 9(B), the respective coil members 21 are wound spirally so as to become rectangular when being observed from the side thereof, so that the coil members are provided with a plurality of the first linear portions 21A located on the first plane 27A, a plurality of the second linear portions 21B located on the second plane 27B parallel to the first plane 27A, a plurality of the first turning portions 21C that couple the first linear portions 21A with the second linear portions 21B adjacent thereto at one side thereof, and a plurality of the second turning portions 21D that couples the first linear portions 21A with the second linear portions 21B adjacent thereto at the other side thereof.

<Pressing step>

Next, a plurality of coil members 21 are formed by pressing. In the pressing step, any one of the respective second linear portions 21B and the first linear portions 21A is pressed to the other so that the plane 27A where the first linear portions 21A exist approaches the plane 27B where the second linear portions 21B exist. As a result, the respective coil members 21 are deformed so that the inner sides of both linear portions 21A and 21B exist on almost the same surface, as shown in FIG. 9(C).

<Displacing step>

Next, the respective coil members 21 are deformed like a tortoise shell as shown in FIG. 2 and FIG. 3, and two coil members 21 are caused to overlap each other, and the respective coil members 21 are deformed to constitute a coil combination 14.

In the displacing step, four movable members 29A, 29B, 29C and 29D are used as a plurality of pins. As shown in FIG. 9(D), the movable members 29A and 29C are disposed at the left side of the coil member 21, the movable members 29B and 29D are disposed at the right side thereof. The movable member 29A has a plurality of pins 29a that simultaneously cause the first end portion 21a of the first linear portion 21A of the respective coil members 21 to move, and the movable member 29B has a plurality of pins 29b that simultaneously cause the first end portion 21b of the second linear portion 21B of the respective coil members to move. In addition, the movable member 29C has a plurality of pins 29c that simultaneously cause the second end portion 21c of the first linear portion 21 of the respective coil members 21 to move, and the movable member 29D has a plurality of pins 29d that simultaneously cause the second end portion 21d of the second linear portion 21B of the respective coil members 21 to move.

FIG. 6(B) and FIG. 10 show the movement of these movable members 29A through 29D. In these drawings, the movable member 29A is moved to the left side to cause the first end portion 21a to move to the left side. The movable member 29B is moved to the right side opposite to the movable member 29A, thereby causing the first end portion 21b to move to the right side. Also, the movable member 29C is moved to the left side to cause the second end portion 21c to move to the left side while the movable member 29D is moved to the right side opposite thereto to cause the second end portion 21d to move the right side. Resulting from the movement, the respective coil members 21 are deformed from the state shown by a solid line in FIG. 10 to the state shown by a dashed line therein.

As has been made clear in FIG. 10, in the respective first linear portions 21A existing on the first plane 27A, the first end portion 21a at the lower end thereof moves to the left while the second end portion 21c at the upper end thereof moves to the right side opposite thereto. In FIG. 10, the respective first linear portions 21A will resultantly extend and exist in the vertical direction. Similarly, in the second linear portions 21B existing on the second plane 27B, the first end portion 21b at the lower end thereof moves to the right while the second end portion 21d at the upper end thereof moves to the left side. Resultantly, the second linear portions 21B will extend and exist in the vertical direction.

The first turning portion 21C and the second turning portion 21D are deformed along with the deformation of the abovementioned linear portions 21A and 21B, wherein these turning points 24c and 24f accordingly protrude at the interim of the linear portions 21A and 21B. Also, in FIG. 6(B), a position-regulating member 28 holds and retains the first end portion at the lower side of the respective coil member 21 and prevents the respective coil members 21 from be dispersed.

Herein, another coil member 21 shown by a one-dashed broken line in FIG. 10 is focused on. The coil member 21 is such that, before the displacing step, the first linear portion 21A thereof crosses the second linear portion 21B of the coil member 21 at the center point C in the lengthwise direction, and after the displacing step, it overlaps the second linear portion 21B of the coil member 21. Similarly, the second linear portion 21B of the coil member 21 crosses the first linear portion 21A of the coil member 21 at the center point C. As a result of the displacing step, it will be attached to the underside of the first linear portion 21A of the coil member 21. Thus, in the displacing step, the respective linear portions of two coil members 21 overlap each other, thereby forming a coil combination 14. Thus, a plurality of coil combinations 14A through 14F are simultaneously bent and formed.

<Inserting step>

A plurality of coil combinations 14A through 14F constructed as described above, respectively, have such a construction as shown in FIG. 5, and are inserted into slots 13 of the stator iron core 11 in the next inserting step. In the inserting step, the linear portions 21A and 21B of the coil members 211 and 212 overlapping each other are inserted into appointed slots and slots separated by "N" slots from the appointed slots. In the appointed slots, the first linear portion 21A of the coil member 211 is located at the inner layer side, and the second linear portion 21B of the coil member 212 is located at the outer layer side, and in the slots separated by "N" slots from the appointed slots, contrarily, the first linear portion 21A of the coil member 212 is located at the inner layer side, and the second linear portion 21B of the coil member 211 is located at the outer layer side. Thereafter, the stator iron core 11A is annularly bent so that the slots 13 come to the inner circumference. Both the end portions thereof are joined together, and necessary wiring is carried out, wherein a stator 10 can be obtained.

Thus, according to the first embodiment, since a plurality of strip coil members 21 are simultaneously bent to constitute a plurality of coil combinations 14, the inserting and joining steps of individual conductor segments, which were indispensable in the prior arts, n be omitted. Therefore, work efficiency can be improved, and improvements in the efficiency of mass-production can be achieved. In addition, since there is no need to clamp coil members by means of fixtures for joining, both the turning portions 21C and 21D can be lowered, whereby a downsizing of the coil assemblies 12 can be achieved.

In addition, according to the method for producing rotating electrical machinery, as shown in FIG. 11(A), since the displacing step S3 is performed after the winding step S1 and pressing step S2, the respective turning portions 21C and 21D can be further made lower. Also, contrarily, as shown in FIG. 11(B), if the displacing step S3 is performed before the pressing step S2, contact between the respective coil members 21 can be prevented from occurring, wherein it is possible to prevent such a situation in which the film is destroyed due to contact, and a layer short-circuit occurs. In addition, in FIG. 11, S4 denotes the inserting step.

Still further, according to the abovementioned producing method, in the winding step, the respective strip coil members 21 are restricted by the respective projections 25a and 25b of the plate-like winding cores 25A and 25B at an appointed angle α a with respect to the center axis L of the core in order to make the band-shaped coil members spiral. However, as shown in FIG. 12, if the strip coil members 21 are wound at an appointed angle α after the band-shaped coil members 21 are supplied in the vertical direction shown by the arrow B in the drawing with respect to the center axis L of the winding core and the respective coil members 21 are restricted by the respective projections 25a and 25b, the winding thereof on the plate-like winding cores 25A and 25B can be made smooth, and it is possible to prevent the respective coil members 21 from being twisted.

Also, in the construction according to the first embodiment, the end portions of the respective coil members 21 are collected and disposed at one end side of the slots 13. However, as shown in FIG. 14, they may be distributed equally at one end side and the other end side and disposed at both end sides. If so, since the coil members 21 may be dispersed at the respective end portions, the connection of the end portions can be facilitated.

Also, as shown at the portion A in FIG. 14, appointed turning portions of the respective coil members are formed so as to protrude higher than the other turning portions. And, by peeling off the insulation film at the appointed turning portions as necessary, lead-out portions 21E can be easily formed, wherein the wiring workability can be improved. In addition, the lead-out portions 21E and connections between wires are omitted in FIG. 1.

Further, it is general that the lead-out portions 21E are connected after the respective coil members 21 are attached to the stator iron core 11 and formed to be annular. But, as shown in FIG. 15, the neutral line of the three-phase connection and the lead-out portions 21E that becomes the cross-over line of the respective phase coils may be connected by TIG welding, caulking or soldering in advance in a state where the respective coils 5 are still linear. In this case, in comparison with the case where the coil members 21 are formed to be annular and connected thereafter, the degree of concentration at the coil end portions may be decreased. Also, since the connection is carried out in a state where the coils are still linear, the connection can be further facilitated, and a space for inserting fixtures can be easily secured, wherein the assembling workability can be remarkably improved.

Still further, by forming the lead-out portions of a member having a circular cross section, peeling-off of the insulation film at the tip end portions can be easily carried out by a machine, and the workability can be further improved.

In addition, as shown in FIG. 6(B), the coil members 21 are deformed to form a tortoise shell by moving the respective movable members 29A and 29D having a plurality of pins. Actually however, the way of forming a tortoise shell is not limited to this. That is, for example, as shown in FIG. 13, movable members having parallel planes 30a and 30b at both sides and a plurality of displaceable plates 30 fitted to the orientation of the respective linear portions 21A and 21B when deforming the coil members 21 may be used. If so, since the respective linear portions 21A and 21B of the coil members 21 are formed to be straight by both parallel planes 30a and 30b of the respective blades 30, insertion thereof into the slots 13 can be facilitated, wherein the assembling workability and insulation ability can be remarkably improved.

Embodiment 2

Figure 16:
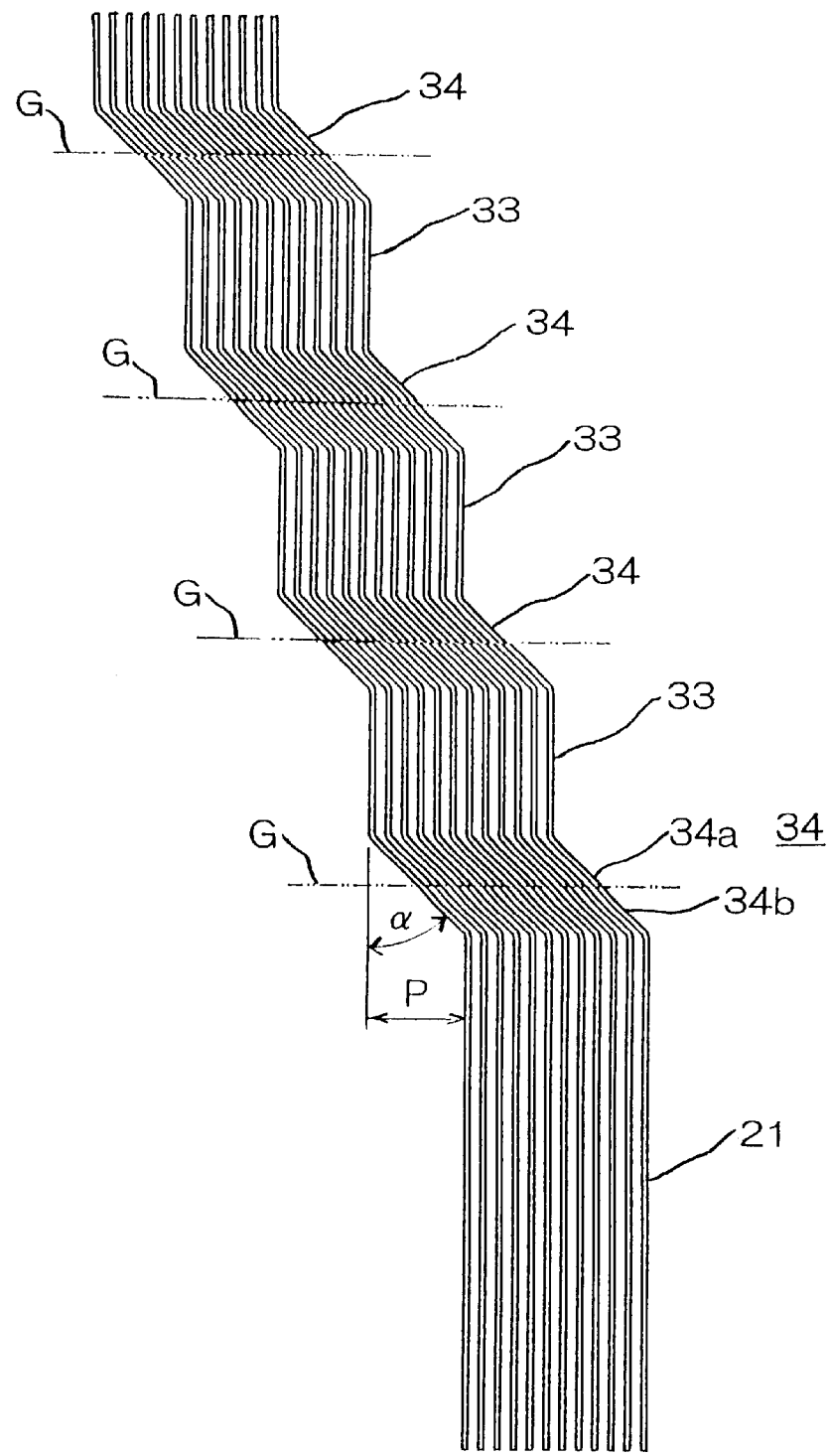
FIG. 16 is a view showing one process in a method for producing a coil assembly of rotating electric machinery according to the second embodiment of the invention.
Figure 17:
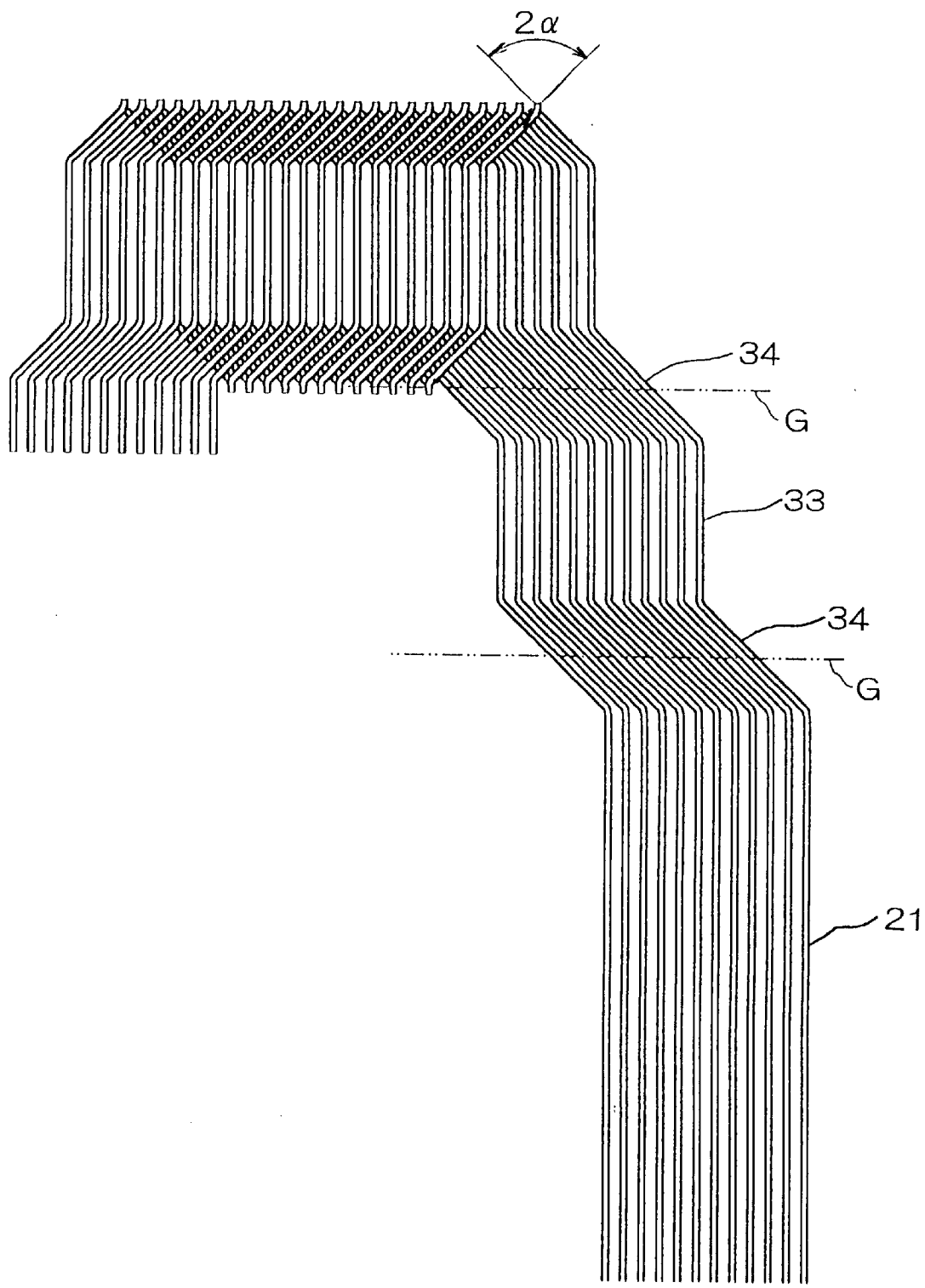
FIG. 17 is a view showing one process differing from the process in FIG. 6 in a method for producing a coil assembly of rotating electric machinery according to the second embodiment of the invention.
Figure 18:
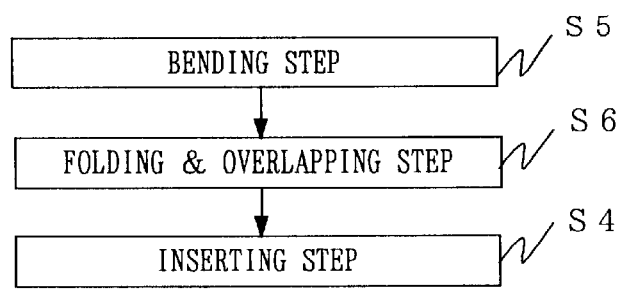
FIG. 18 is a block diagram showing the steps of a method for producing a coil assembly of rotating electric machinery according to the second embodiment of the invention.
Figure 19:
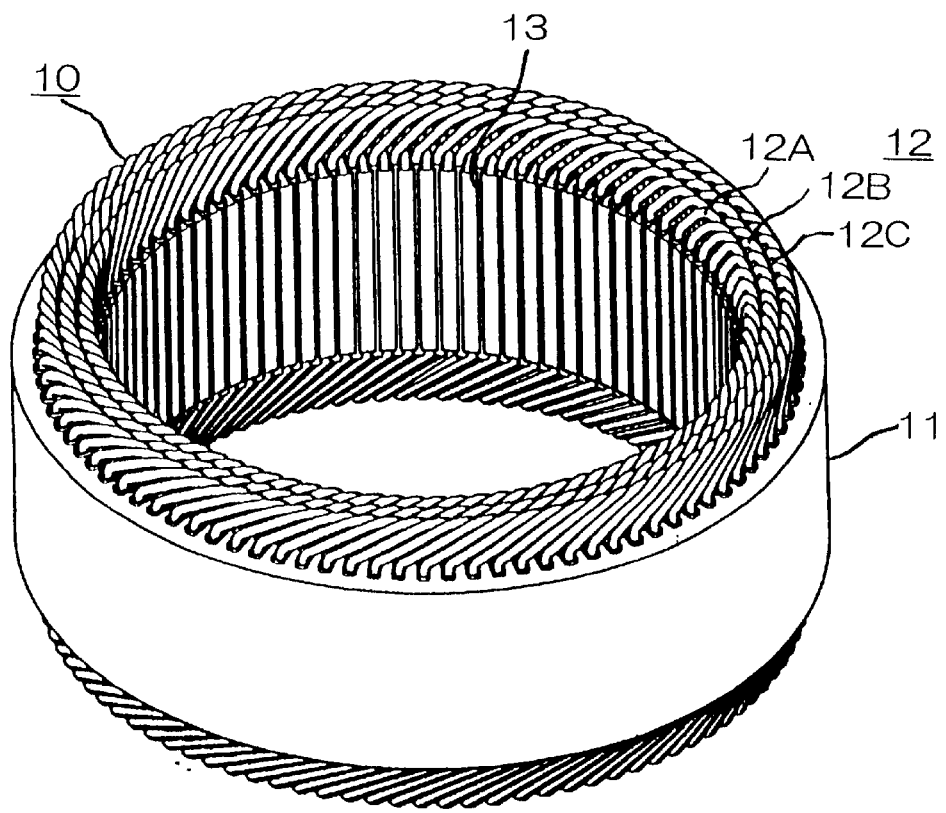
FIG. 19 is a perspective view showing the appearance of a stator of an alternate current generator for vehicles, which is different from that to which a coil according to the first or the second embodiments is applied.
Figure 20:
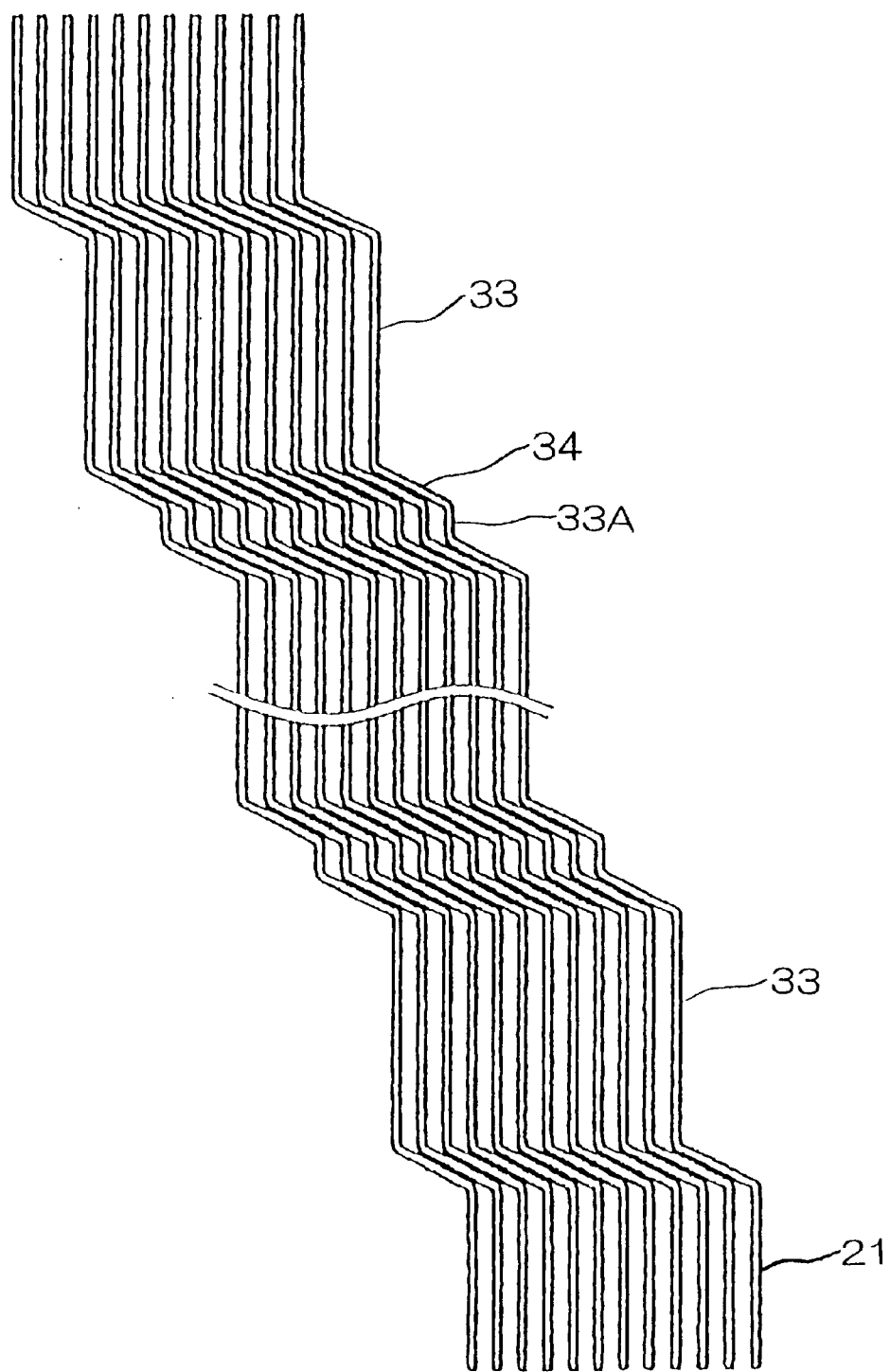
FIG. 20 is a view showing a method differing from that in FIG. 16 showing the process for producing a coil assembly according to the second embodiment of the invention.

FIG. 16 is a view showing a step in a method for producing a coil assembly of rotating electrical machinery according to the second embodiment. FIG. 17 is a view showing a step, which is different from the step in FIG. 16, in a method for producing a coil assembly of rotating electrical machinery according to the second embodiment. FIG. 18 is a block diagram showing steps in a method for producing a coil assembly of rotating electrical machinery according to the second embodiment. FIG. 19 is a perspective view showing the appearance a stator of an alternate current generator for vehicles, which is different from FIG. 1 in which coil members in the first and second embodiments are applied. FIG. 20 is a view showing a method that is different from the method in FIG. 16 showing the steps of producing a coil assembly in the second embodiment of the invention.

A coil assembly of rotating electrical machinery secured by the second embodiment is similar to that in which a coil assembly 12 according to the first embodiment described above is disposed. Therefore, no further illustration is provided. However, since the production method differs from that of the first embodiment, a description is given of the production method with reference to the drawings.

First, by bending a plurality of strip coil members 21 on one plate, a plurality of linear portions 33 disposed so as to shift by an appointed pitch P, and a plurality of inclined portions 34 connecting between the plurality of linear portions 33 are formed. The respective inclined portions 34 are inclined at an appointed angle a with respect to the respective linear portions 34.

Next, at bisectors G of the respective inclined portions 34, which are shown by a two-dashed broken line in FIG. 16, the respective coil members 21 are bent. The respective bisectors G are located at the positions where the respective inclined portions 34 are divided into an upper half portion 34a and a lower half portion 34b, wherein the coil members 21 are bent at the bisectors G so that the lower half portions 34b cross and overlap the respective coil members 21 of the upper half portions 34a at an angle α. The bending work is carried out from the inclined portion 34 located extremely upward in FIG. 16 one after another. As a result, as in the first embodiment, the first linear portions 21A and the second linear portions 21B are formed, corresponding to the respective linear portions 33, and the first turning portions 21C and the second turning portions 21D are formed, corresponding to the respective inclined portions 34. A plurality of tortoise shell-like coil combinations 14 are simultaneously produced as in FIG. 5. In the bending step, the second linear portion 21B of another coil member is piled up on the first linear portion 21A of one coil member, and the first linear portion 21A of another coil member 1 is attached below the second linear portion 21B of one coil member, wherein the coil combination 14 having the same construction as that in FIG. 5 is constituted.

And, as in the first embodiment, the first linear portion 21A of the coil members 211 overlapping each other and the second linear portion 21B of the coil members 212 are inserted into appointed slots 13, and the second linear portions 21B of the coil members 211 overlapping each other and the first linear portions 21A of the coil members 212 are inserted into slots 13 separated by "N" slots from the appointed slots 13.

Thus, according to the second embodiment, since a plurality of coil combinations 14 can be obtained by carrying out the folding step S6 to fold up a plurality of strip coil members 21 after the bending step S5 to bend them on a plane as shown in FIG. 18, steps for inserting conductor segments and joining the same, which are necessary in the prior arts, can be omitted as in the first embodiment described above. Therefore, the work efficiency can be improved, and the mass productivity can also be improved. Further, no clamping by means of fixtures is required for joining together, wherein both the turning portions 21C and 21D can be made lower, and the coil assemblies 12 can be downsized. In addition, in FIG. 18, Step S4 is the same inserting step as in FIG. 11.

Furthermore, in the first and second embodiments described above, a description was given of the construction of a stator 10 in which the coil assemblies 12A and 12B are piled up in two layers and inserted into slots. But, the construction is not limited to the above construction. For example, a stator 10 may be constructed by using coil assemblies 12 consisting of three-layered coil assemblies 12A, 12B and 12C as shown in FIG. 19. In this case, effects which are similar to those in the first and second embodiments can be brought about.

Still further, the second linear portions 33A that are parallel to the linear portions 33 may be formed, as shown in FIG. 20, halfway along the inclined portions 34 shown in FIG. 16. By the second linear portions 33A, turning portions by which lead-out portions, etc., can be easily formed may be formed, wherein the wiring workability can be improved.

Embodiment 3

Figure 21:
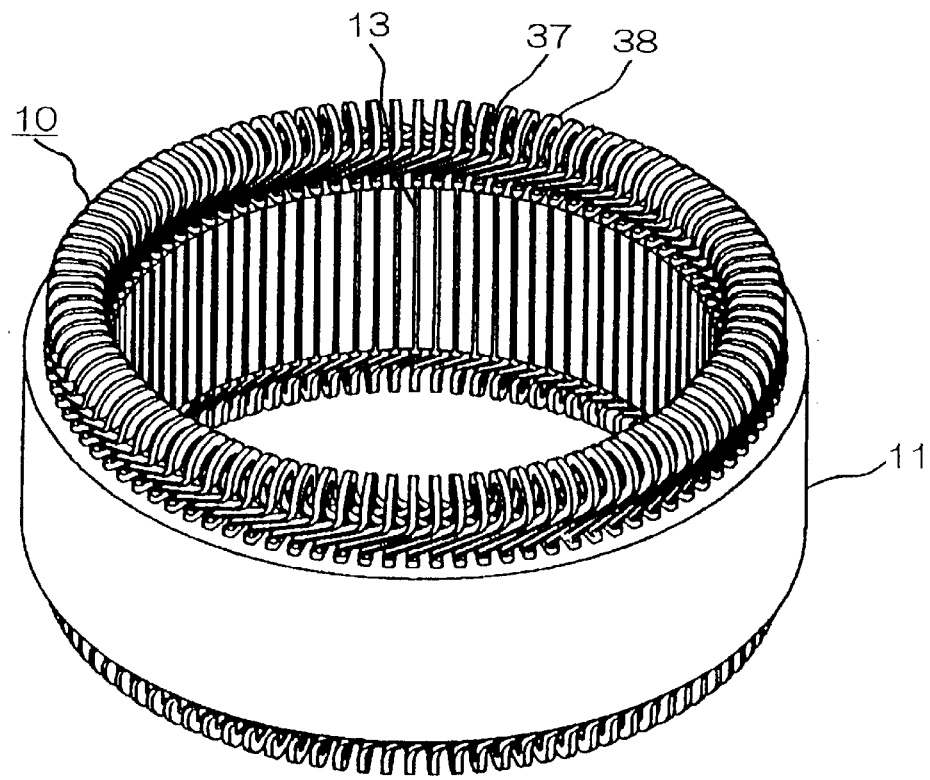
FIG. 21 is a perspective view showing the appearance of a stator of an alternate current for vehicles to which a coil according to the third embodiment of the invention is applied.
Figure 22:
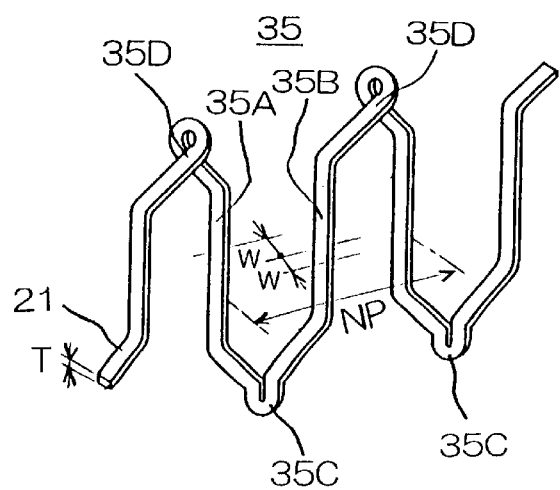
FIG. 22 is a perspective view explaining the profile of the first coil member in FIG. 21.
Figure 23:
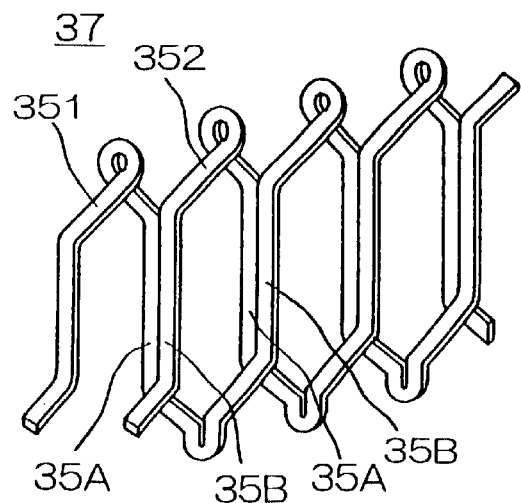
FIG. 23 is a perspective view explaining the array of the first coil member in FIG. 21.
Figure 24:
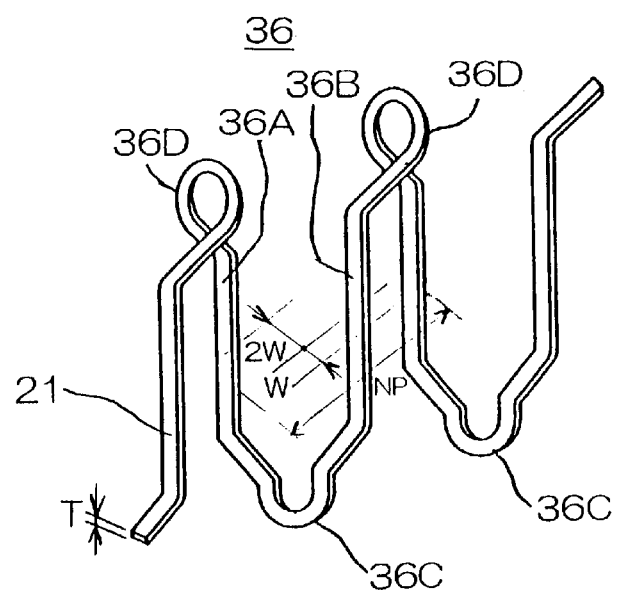
FIG. 24 is a perspective view explaining the profile of the second coil member in FIG. 21.
Figure 25:
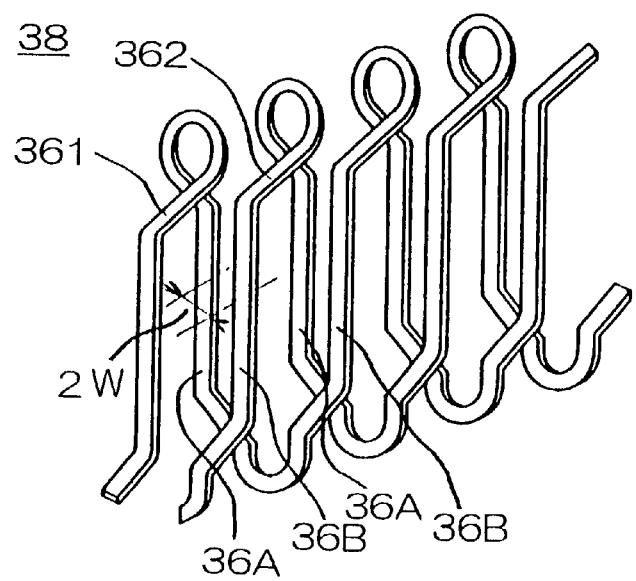
FIG. 25 is a perspective view explaining the array of the second coil member in FIG. 21.
Figure 26:
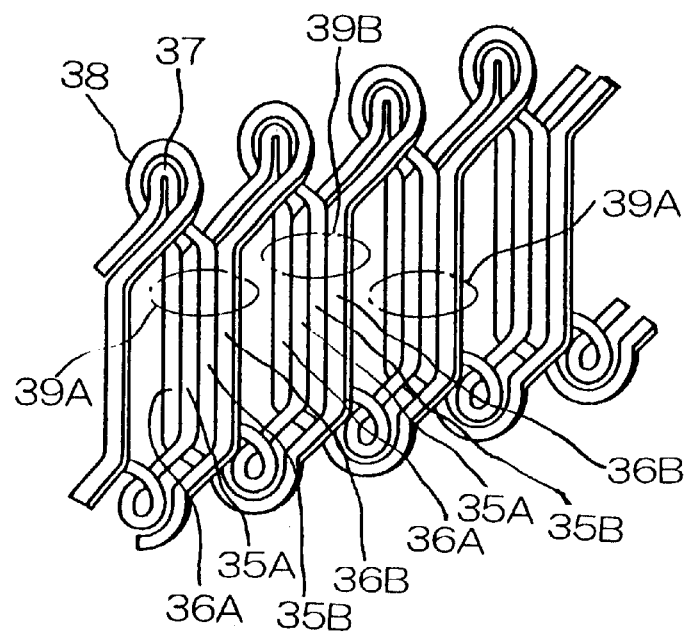
FIG. 26 is a perspective view explaining the array of combinations of a coil combination in FIG. 21.
Figure 27:
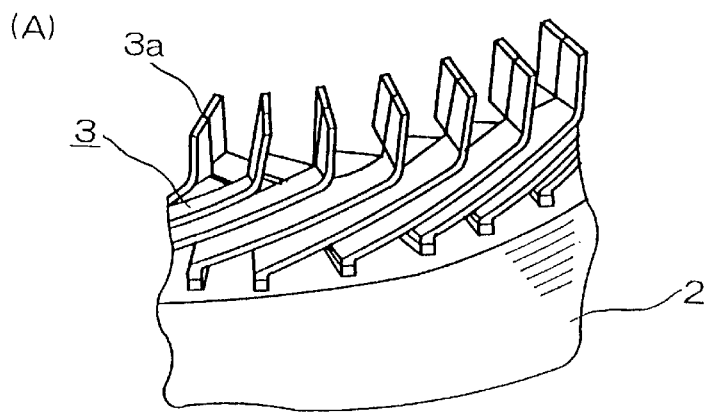
FIG. 27(A) is a perspective view showing the major parts of a prior art stator coil for an alternate current generator for vehicles, which is observed from its front side, and (B) is a perspective view thereof when being observed from its rear side.
Figure 27:
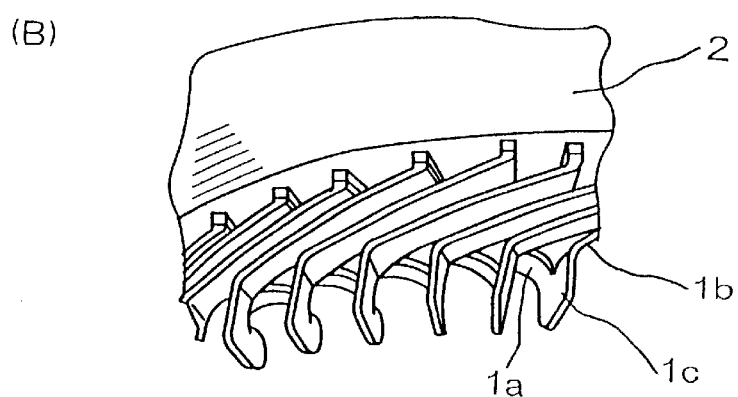
Figure 28:
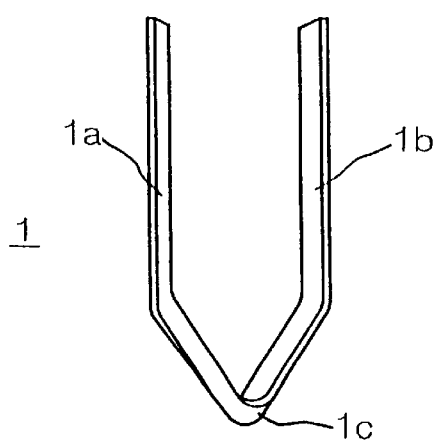
FIG. 28 is a perspective view showing the construction of a conductor segment that is applied to the stator coil for an alternate current generator for vehicles in FIG. 27.

FIG. 21 is a perspective view showing the appearance of a stator of an alternate current generator for vehicles, to which a coil according to the third embodiment of the invention is applied, FIG. 22 is a perspective view explaining the profile of the first coil in FIG. 21, FIG. 23 is a perspective view explaining an array profile of the first coil member in FIG. 21, FIG. 24 is a perspective view explaining the profile of the second coil member in FIG. 21, FIG. 25 is a perspective view explaining an array profile of the second coil member in FIG. 21, and FIG. 26 is a perspective view explaining an array of combinations of coil combinations in FIG. 21.

In the drawings, parts which are identical to those of the first embodiment are given the same reference numbers, and overlapping description thereof is omitted. The first coil members 35 is formed of one strip conductor having a width W and a thickness T as in the coil member 21 in the first embodiment described above. And, the first coil members 35 are formed of the first linear portions 35A and the second linear portions 35B, which are alternately disposed at the inner layer side and the outer layer side of the slots 13, shifting by the width W in the direction of lamination at an appointed pitch P as shown in FIG. 22, and the first turning portions 35C and the second turning portions 35D that connect both the linear portions 35A and 35B outward of one end side and the other end side of the slots 13 in the lengthwise direction.

The second coil member 36 is formed of one strip conductor having a width W and a thickness T. The second coil member 36 consists of the first linear portions 36A and the second linear portions 36B, which are alternately disposed at the inner layer side and the outer layer side of the slots 13, leaving an interval equivalent to the dimension 2W, which is two times the width W, in the direction of lamination at an appointed pitch P as shown in FIG. 24, and the first turning portions 36C and the second turning portions 36D that connect both the linear portions 36A and 36B outward of one end side and the other end side of the slots 13 in the lengthwise direction.

And, two of the first coil members 35 formed as shown in FIG. 22 are combined to constitute the first coil combination 37. Two coil members to be combined are shown with reference numbers 351 and 352. The coil combination 37 is combined so that the first linear portion 35A of the coil member 351 and the second linear portion 35B of the coil member 352 are piled up as shown in FIG. 23. On the other hand, two of the second coil members 36 formed as shown in FIG. 24 are combined to constitute the second coil combination 38. The two coil members to be combined are shown with reference numbers 361 and 362. The coil combination 38 is disposed so that the first linear portion 36A of the coil member 361 opposes the second linear portion 36B of he coil member 362 via a space 2W as shown in FIG. 25, and the second linear portion 36B of the coil member 361 opposes the first linear portion 36A of the coil member 362 via a space 2W.

Subsequently, the first coil combination 37 and the second coil combination 38 are combined with each other as shown in FIG. 26. In FIG. 26, the first coil combination 37 is combined with the second coil combination so that the overlapping section of the two linear portions 35A and 35B of the first coil combination 37 is inserted into the space 2W in the second coil combination 38. In FIG. 26, at the first portion 39A where four linear portions 35A, 35B 36A and 36B are piled up, the first linear portion 36A of the coil member 361 is located on the first layer at the extremely inner side, the first linear portion 35A of the coil member 351 is located on the second layer of the outer circumference thereof, the second linear portion 35B of the coil member 352 is located on the third layer of the further outer circumference thereof, and the second linear portion 36B of the coil member 362 is located on the fourth layer which is the extremely outer circumference. At another second portion 39B where the four linear portions are piled up, the first linear portion 36A of the coil member 362 is located on the first layer which is the extremely inner side, the first linear portion 35A of the coil member 352 is located on the second layer of the outer circumference thereof, the second linear portion 35B of the coil member 351 is located on the third layer of the further outer circumference thereof, and the second linear portion 36B of the coil member 361 is located on the fourth layer which is the extremely outer side.

Next, the coil combinations 37 and 38 are incorporated in the stator iron core 11A so that the first portion 39A in FIG. 26 is inserted into appointed slots 13, and the second portion 39B therein is inserted into slots 13 separated by "N" slots from the appointed slots 13. The other coil combinations are inserted into the other slots 13. After internal wiring necessary for these coil combinations is provided, the stator iron core 11A is annularly bent to secure the stator 10.

Coil members 351 and 352 in the third embodiment constructed as described above are formed by a method that is similar to that for the coil members 211 and 212 in the first and second embodiments. Also, since coils 361 and 362 are formed by shifting the first and second linear portions 36A and 36B opposed thereto by the internal 2W therebetween, a description of the production method is omitted.

Thus, according to the third embodiment, since the first and second coil combinations 37 and 38 that are formed by the same production method as that in the first and second embodiments are combined, the efficiency of mass-production and downsizing are enabled as in the first and second embodiments.

In addition, in each of the first through the third embodiments, the insulation thereof can be prevented from being lowered by using a strip coil member having a rectangular cross-section, and the occupancy ratio of the coil members in a slot 13 can be improved.

However, the cross-section of the coil member is not limited to this. For example, a strip coil member having a circular cross-section may be used instead, wherein if such a strip coil member having a circular cross-section is used, the following effects will be further enabled.

That is, it will become easy for fixtures to be mounted in the winding step, and there will be no worry about twisting of the strip member when winding a coil member. Therefore, the efficiency of production can be further improved. In addition, it will become possible to suppress the breakage of insulation films due to bending of the tip ends of the turning portions in the displacing step, wherein the efficiency of insertion into the stator iron cores 11 and 11A is improved to reduce the breakage of the films. Still further, breakage of the films, which results from mutual contact of the respective coil members when making the stator iron core 11A annular by bending, can be reduced. Breakage of the films due to mutual contact of coil members in the slots 13 of the stator iron core 11 or between the coil members and the inner wall surface of the slots 13 can be reduced, thereby improving the insulation property.

In addition, in the step of peeling off films at the end portions of the coil members, mechanical peeling can be facilitated, thereby improving the workability. Since cooling airflow passing through the coil end portions can be smoothened, and airflow noise can be reduced, wherein the reliability can be improved.

Still further, although not explained in the first through the third embodiments, the case of the coil members 35 and 36 shown in FIG. 26 is taken for instance, wherein if the respective first turning portions 35C, 36C and the second turning portions 35D and 36D are inclined in the same side in the circumferential direction, the height of the coil ends can be made lower, and downsizing can be achieved. At the same time, ventilation resistance at the coil ends can be reduced, wherein the cooling property can be further improved.

What is claimed is:

1. A coil assembly of rotating electrical machinery, which is mounted in a plurality of slots formed on the circumferential surface of an iron core at appointed pitches P, having a plurality of coil combinations, in which the respective coil combinations comprises a combination of a first coil member and a second coil member;

wherein each of said first coil member and second coil member includes:

a plurality of first linear portions disposed at pitches equal to "N" times ("N" is any natural number) said pitches P and respectively inserted in one of said plurality of slots;

a plurality of second linear portions disposed at pitches equal to "N" times said pitches P, positioned at the middle of said respective first linear portions and inserted into one of said plurality of slots;

a plurality of first turning portions for coupling said respective first linear portions with said respective second linear portions adjacent to one side of said respective first liner portions at one end side of said slots; and a plurality of second turning portions for coupling said respective first linear portions with said respective second linear portions adjacent to other side of said respective first liner portions at the other end side of said slots;

wherein said respective first linear portions, first turning portions, second linear portions and second turning portions are formed so as to be continued to each other by one strip member; and said first coil member and second coil member are combined so that in an appointed slot of said plurality of slots, the first linear portion of said first coil members is located at the inner layer side and the second linear portion of said second coil members is located at the outer layer side, and, in a slot separated by "N" slots from said appointed slot, the first linear portion of said second coil member is located at the inner layer side and the second linear portion of said first coil member is located at the outer layer side.

2. A coil assembly of rotating electrical machinery as set forth in claim 1, wherein said first turning portions and said second turning portions, respectively, have an inclined portion extending said respective appointed slot to a turning point, and an inclined portion extending from said slot separated by "N" slots from said appointed slot to said turning point; and said turning point is displaced so as to be positioned nearer said slot separated by "N" slots from said appointed slot than said appointed slot.

3. A coil assembly of rotating electrical machinery as set forth in claim 1, wherein said first and second coil members are formed so that said respective first linear portions, first turning portions, second linear portions and second turning portions are continued by one strip member having an almost rectangular section.

4. A coil assembly of rotating electrical machinery as set forth in claim 1, wherein said first and second coil members are formed so that said respective first linear portions, first turning portions, second linear portions and second turning portions are continued by one strip member having almost a circular section.

5. A coil assembly of rotating electrical machinery, which is mounted in a plurality of slots formed on the circumferential surface of an iron core at appointed pitches P, having a plurality of coil combinations, in which the respective coil combinations comprises a combination of a first coil member to a fourth coil member;

wherein each of said first coil member to said fourth coil member includes:

a plurality of first linear portions disposed at pitches equal to "N" times ("N" is any natural number) said pitches P and respectively inserted in one of said plurality of slots;

a plurality of second linear portions disposed at pitches equal to "N" times said pitches P, positioned at the middle of said respective first linear portions and inserted into one of said plurality of slots;

a plurality of first turning portions for coupling said respective first linear portions with said respective second linear portions adjacent to one side of said respective first liner portions at one end side of said slots; and a plurality of second turning portions for coupling said respective first linear portions with said respective second linear portions adjacent to other side of said respective first liner portions at the other end side of said slots;

wherein said respective first portions, first turning portions, second linear portions and second turning portions are formed so as to be continued to each other by one strip member;

said first coil member and second coil member are combined so that in an appointed slot of said plurality of slots, the first linear portion of said first coil members is located in the first layer and the second linear portion of said second coil members is located in the fourth layer, and, in a slot separated by "N" slots from said appointed slot, the first linear portion of said second coil member is located in the first layer and the second linear portion of said first coil member is located in the fourth layer; and said third coil member and fourth coil member are combined so that in the appointed slot of said plurality of slots, the first linear portion of said third coil members is located in the second layer and the second linear portion of said fourth coil members is located in the third layer, and, in the slot separated by "N" slots from said appointed slot, the first linear portion of said fourth coil member is located in the second layer and the second linear portion of said third coil member is located in the third layer.

6. A method for producing a coil assembly of rotating electrical machinery, comprising the steps of:

winding step for winding a plurality of strip members coaxial with each other so that said plurality of strip coil members, respectively, are provided with: a plurality of the first linear portions located on the first plane; a plurality of the second linear portions located at the second plane parallel to said first plane; a plurality of the first turning portions for coupling said respective first linear portions with said respective second linear portions adjacent to one side of said respective first liner portions; and a plurality of the second turning portions for coupling said respective first linear portions with said second linear portions adjacent to the other side of said respective first liner portions and displacing step for displacing said respective first linear portions on said first plane and said second linear portions on the second plane so that these linear portions move in parallel to each other, by displacing the first end portions of said respective first linear portions of said plurality of coil members on said first plane, and the first end portions of said respective second linear portions thereof on said second plane in the direction opposed to each other, and concurrently displacing the second end portions of said respective linear portions of said respective coil members on said second plane and the second end portions of said respective first linear portions thereof on said first plane in the direction opposed to each other;

wherein in said displacing step, a plurality of coil assemblies in which two coil members of said plurality of coil members are combined are formed, said respective coil assemblies have said respective second linear portions of the second coil members positioned on said respective first linear portions of the first coil members, and have said respective first linear portions of said second coil members positioned below said respective second linear portions of said first coil members.

7. A method for producing a coil assembly of rotating electrical machinery, as set forth in claim 6, wherein said plurality of coil assemblies are, respectively, combined and inserted so that, in an appointed slot of a plurality of slots formed on an iron core at appointed pitches P, the first linear portions of said first coil members are located on the first layer, and the second linear portions of said second coil members are located on the second layer, and in slots separated by "N" slots from the appointed slot, the first linear portions of said second coil members are located on the first layer and the second linear portions of said first coil members are located on the second layer.

8. A method for producing a coil assembly of rotating electrical machinery, as set forth in claim 7, further comprising the step of pressing the respective coil members so that the respective first linear portions on said first plane are caused to approach the respective second linear portions on said second plane.

9. A method for producing a coil assembly of rotating electrical machinery, as set forth in claim 8, wherein said pressing step is carried out before said displacing step.

10. A method for producing a coil assembly of rotating electrical machinery, as set forth in claim 8, wherein said pressing step is carried out after said displacing step.

11. A method for producing a coil assembly of rotating electrical machinery, as set forth in claim 7, wherein, before inserting said respective coil combinations into the slots after said displacing step, lead-out conductors are formed at necessary coil members and necessary connections are carried out.

12. A method for producing a coil assembly of rotating electrical machinery, as set forth in claim 7, in which said respective first turning portions and said respective second turning portions have an inclined portion extending from said respective appointed slots to a turning point, and an inclined portion extending from a slot separated by "N" slots from said appointed slots to said turning point, further comprising the step of displacing said turning point so that said turning point is located nearer the slot separated by "N" slots from said appointed slots than said appointed slots.

13. A method for producing a coil assembly of rotating electrical machinery, as set forth in claim 7, wherein, when said displacing step is terminated, both-end portions of said plurality of coil members are collected and disposed at the same side as that of any one of said plurality of the first turning portions and said plurality of the second turning portions.

14. A method for producing a coil assembly of rotating electrical machinery, as set forth in claim 7, wherein, when said displacing step is terminated, both-end portions of said plurality of coil members are distributed to the same side as that of said plurality of the first turning portions and the same side as that of said plurality of the second turning portions and disposed thereat.

15. A method for producing a coil assembly of rotating electrical machinery, as set forth in claim 7, wherein in said displacing step, the first end portions of the respective first linear portions of said plurality of coil members, the first end portions of said respective second linear portions thereof, the second end portions of the respective second linear portions of the respective coil members, and the second end portions of the respective first linear portions thereof are, respectively, displaced by separate movable members.

16. A method for producing a coil assembly of rotating electrical machinery, as set forth in claim 15, wherein said movable member having a plurality of pins are used as said respective movable members.

17. A method for producing a coil assembly of rotating electrical machinery, as set forth in claim 15, wherein said movable member having a plurality of blades is used as said respective movable members, and the respective blades are brought into facial contact with the linear portions of the respective coil members.

18. A method for producing a coil assembly of rotating electrical machinery, comprising the steps of:

bending step for forming a plurality of linear portions and a plurality of inclined portions in the form such that they are inclined at an appointed angle with respect to respective adjacent linear portions between said adjacent linear portions and said inclined portion is placed therebetween, by bending a plurality of strip coil members almost parallel to each other on a certain plane a plurality of times; and folding and overlapping step for folding and overlapping the respective coil members of said respective inclined portions one after another at the position where said coil members are equally divided into one half section and the other half section in its lengthwise direction so that said other half section crosses and overlaps said one half section at said appointed angle;

wherein, in said folding and overlapping step, a plurality of coil combinations in which two coil members of said plurality of coil members are combined are formed, said respective coil combinations have said respective second linear portions of said second coil members positioned on respective first linear portions of said first coil members, and have respective first linear portions of said second coil members positioned below respective second linear portions of said first coil members.

19. A method for producing a coil assembly of rotating electrical machinery, as set forth in claim 18, wherein said plurality of coil combinations are, respectively, combined and inserted so that, in an appointed slot of a plurality of slots formed on an iron core at appointed pitches P, the first linear portions of said first coil members are located on the first layer, and the second linear portions of said second coil members are located on the second layer, and in slots separated by "N" slots from the appointed slot, the first linear portions of said second coil members are located on the first layer and the second linear portions of said first coil members are located on the second layer.

20. A stator of rotating electric machinery comprising a stator iron core having a plurality of slots formed along the circumferential surface at appointed pitches P and a coil assembly mounted the slots of said stator iron core, and having a plurality of coil combinations, in which the respective coil combinations comprises a coil combinations of a first coil members and a second coil members, wherein each of said first coil members and said second coil members including:

a plurality of first linear portions disposed at pitches equal to "N" times ("N" is any natural number) said pitches P and respectively inserted in one of said plurality of slots;

a plurality of second linear portions disposed at pitches equal to "N" times said pitches P, positioned at the middle of said respective first linear portions and inserted into one of said plurality of slots;

a plurality of first turning portions for coupling said respective first linear portions with said respective second linear portions adjacent to one side of said respective first liner portions thereto at one end side of said slots; and a plurality of second turning portions for coupling said respective first linear portions with said respective second linear portions adjacent to the other side of said respective first liner portions at the other end side of said slots;

wherein said respective first linear portions, first turning portions, second linear portions and second turning portions are formed so as to be continued to each other by one strip member; and said first coil member and second coil member are combined so that in an appointed slot of said plurality of slots, the first linear portion of said first coil members is located at the inner layer side and the second linear portion of said second coil members is located at the outer layer side, and, in a slot separated by "N" slots from said appointed slot, the first linear portion of said second coil member is located at the inner layer side and the second linear portion of said first coil member is located at the outer layer side.

* * * * *